United States Patent
Zikeli et al.

(10) Patent No.: US 9,101,903 B2
(45) Date of Patent: Aug. 11, 2015

(54) MODULAR REACTOR

(75) Inventors: Stefan Zikeli, Österreich (AT);
Friedrich Ecker, Österreich (AT);
Michael Longin, Österreich (AT); Klaus Weidinger, Österreich (AT)

(73) Assignees: ONEA-ENGINEERING AUSTRIA GMBH, Vocklabruck (AT); AUROTEC GMBH, Vocklabruck (AT)

( * ) Notice: Subject to any disclaimer, the term of this patent is extended or adjusted under 35 U.S.C. 154(b) by 438 days.

(21) Appl. No.: 13/128,255

(22) PCT Filed: Nov. 10, 2009

(86) PCT No.: PCT/EP2009/064902
§ 371 (c)(1),
(2), (4) Date: May 9, 2011

(87) PCT Pub. No.: WO2010/055034
PCT Pub. Date: May 20, 2010

(65) Prior Publication Data
US 2011/0224463 A1    Sep. 15, 2011

(30) Foreign Application Priority Data

Nov. 11, 2008  (EP) .................................. 08450178

(51) Int. Cl.
*B01J 8/00*       (2006.01)
*B01J 19/00*      (2006.01)

(52) U.S. Cl.
CPC ...... *B01J 19/0093* (2013.01); *B01J 2219/0081* (2013.01); *B01J 2219/00783* (2013.01); *B01J 2219/00873* (2013.01); *B01J 2219/00889* (2013.01)

(58) Field of Classification Search
CPC .............. B01J 2219/00873; B01J 2219/00869
USPC ................................... 422/603, 503; 117/204
See application file for complete search history.

(56) References Cited

U.S. PATENT DOCUMENTS 4,648,565 A    3/1987  Maehara
4,763,727 A *  8/1988  Kreuzer et al. ............... 165/171

(Continued)

FOREIGN PATENT DOCUMENTS

DE    34 29010    1/1986
EP    1 520 838   4/2005

(Continued)

OTHER PUBLICATIONS

M.W. Losey, M.A. Schmidt, K.F. Jensen, "Microfabricated Multiphase Packed-Bed Reactors: Characterization of Mass Transfer and Reactions", *Ind. Eng. Chem. Res.*, vol. 40, 2001, pp. 2555-2562.

(Continued)

*Primary Examiner* — Natalia Levkovich
(74) *Attorney, Agent, or Firm* — Greer, Burns & Crain, Ltd.

(57) ABSTRACT

Modular microreactors are provided composed of microreactor parts including a plate body which has, on one plate side, a groove-shaped depression in which a reactor tube is accommodated, and the reaction tube has connection ends on the outer sides of the plate body. Also disclosed are reaction tubes for turbulent mixing, kits for producing the reactors and the use thereof for commencing chemical reactions.

13 Claims, 20 Drawing Sheets

(56) References Cited

U.S. PATENT DOCUMENTS

| | | |
|---|---|---|
| 5,648,565 A | 7/1997 | Konig et al. |
| 8,381,798 B2 | 2/2013 | Fujiwara et al. |

FOREIGN PATENT DOCUMENTS

| | | |
|---|---|---|
| EP | 1 738 820 | 11/2009 |
| EP | 1738820 | 11/2009 |
| JP | 1977-81492 | 6/1977 |
| JP | 1985-105967 | 7/1985 |
| JP | 03 014803 | 1/1991 |
| JP | 03014803 | 1/1991 |
| JP | 2007029887 | 2/2007 |
| JP | 2007240098 | 9/2007 |
| JP | 2008246349 | 10/2008 |
| WO | WO 2005/123241 | 12/2005 |
| WO | WO 2007/032810 | 3/2007 |
| WO | WO 2007/112945 | 10/2007 |

OTHER PUBLICATIONS

European Search Report for priority application EP 08450178.2, Dated Jun. 30, 2009.

M.W. Losey, M.A. Schmidt, K.F. Jensen, "Microfabricated Multiphase Packed-Bed Reactors: Characterization of Mass Transfer and Reactions", *Ind. Eng. Chem. Res.*, vol. 40, 2001, pp. 2555-2562, Dated 2001, No. 12.

Examination Report in JP Pat.-Anm. Nr. 2011-535990 mailed Oct. 31, 2014.

M.W. Losey, M.A. Schmidt, K.F. Jensen, "Microfabricated Multiphase Packed-Bed Reactors: Characterization of Mass Transfer and Reactions", *Ind. Eng. Chem. Res.*, vol. 40, 2001, pp. 2555-562.

European Search Report for priority application EP 08450178.2.

\* cited by examiner

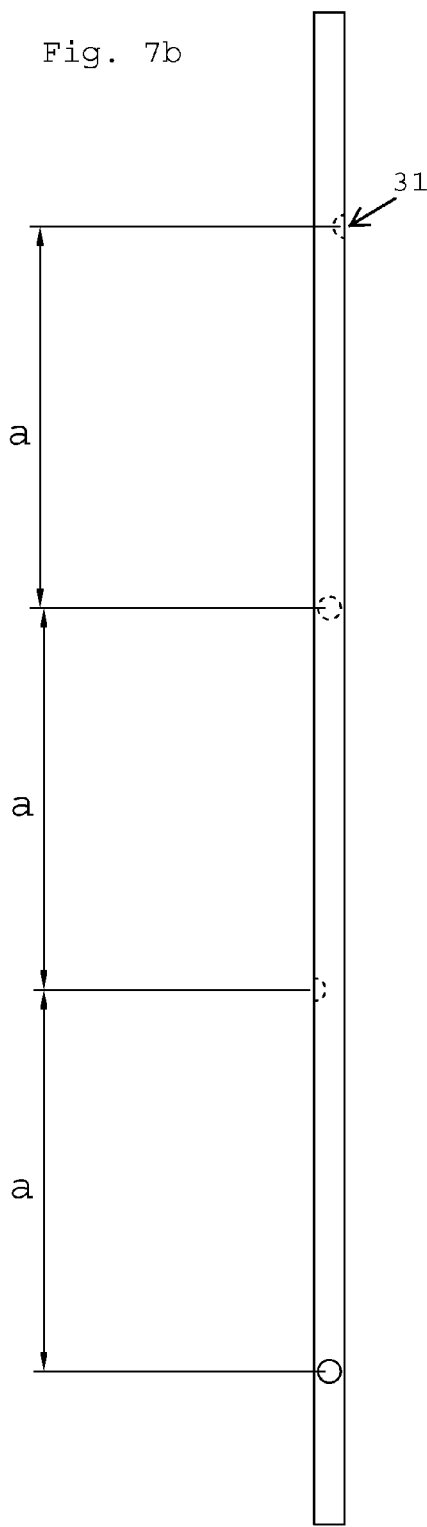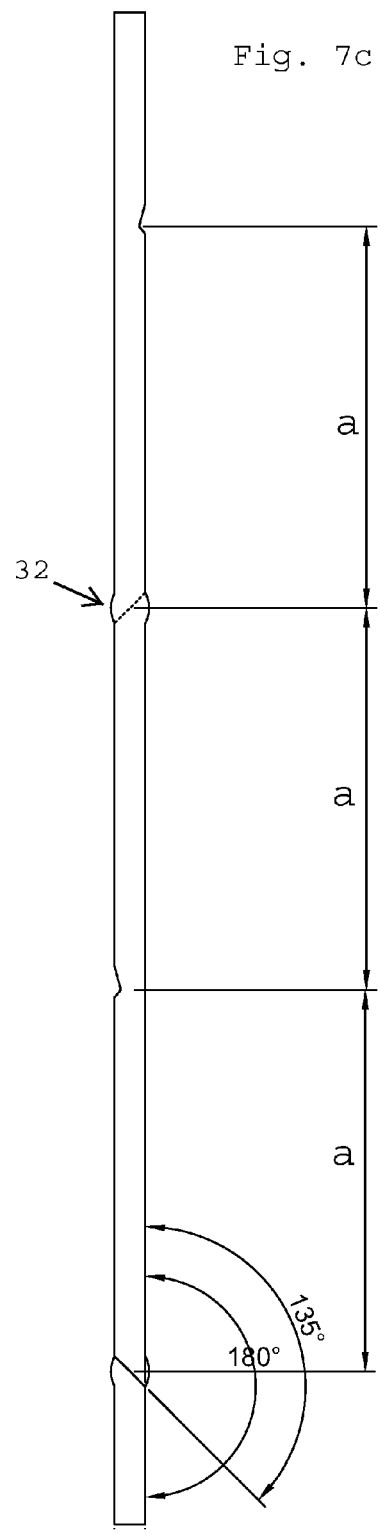

a) 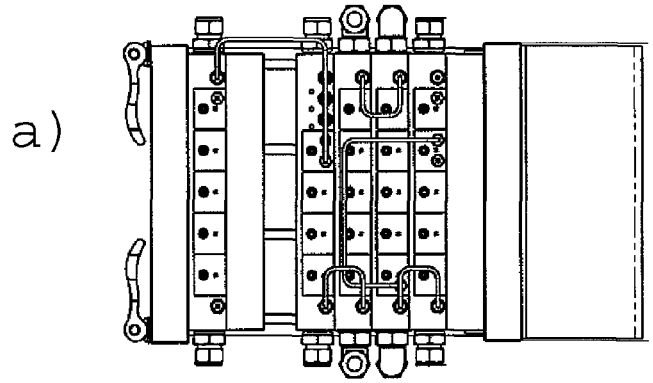
b) 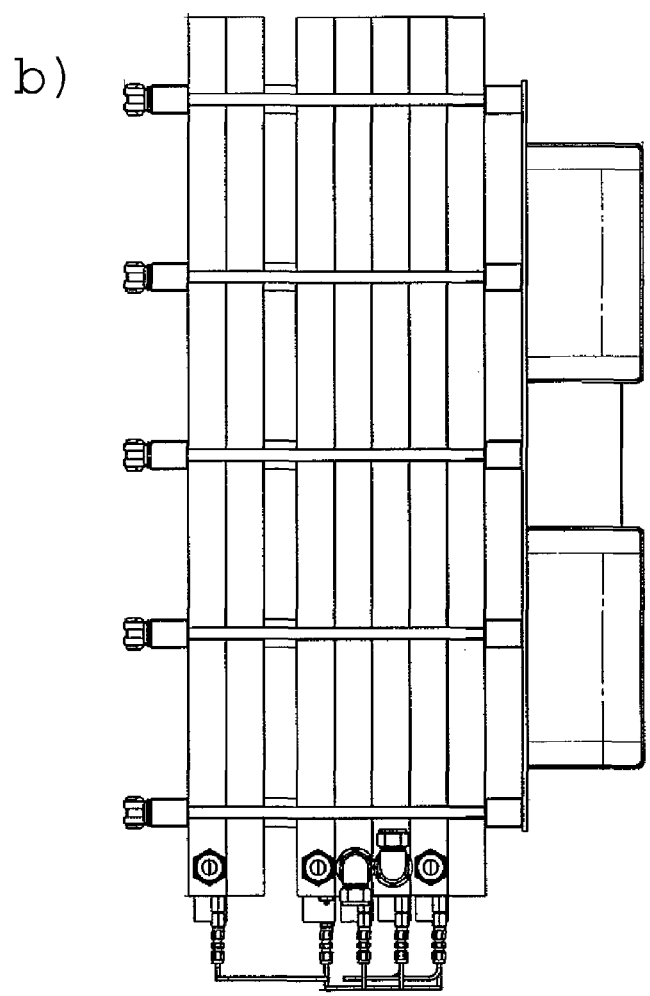
Fig. 12

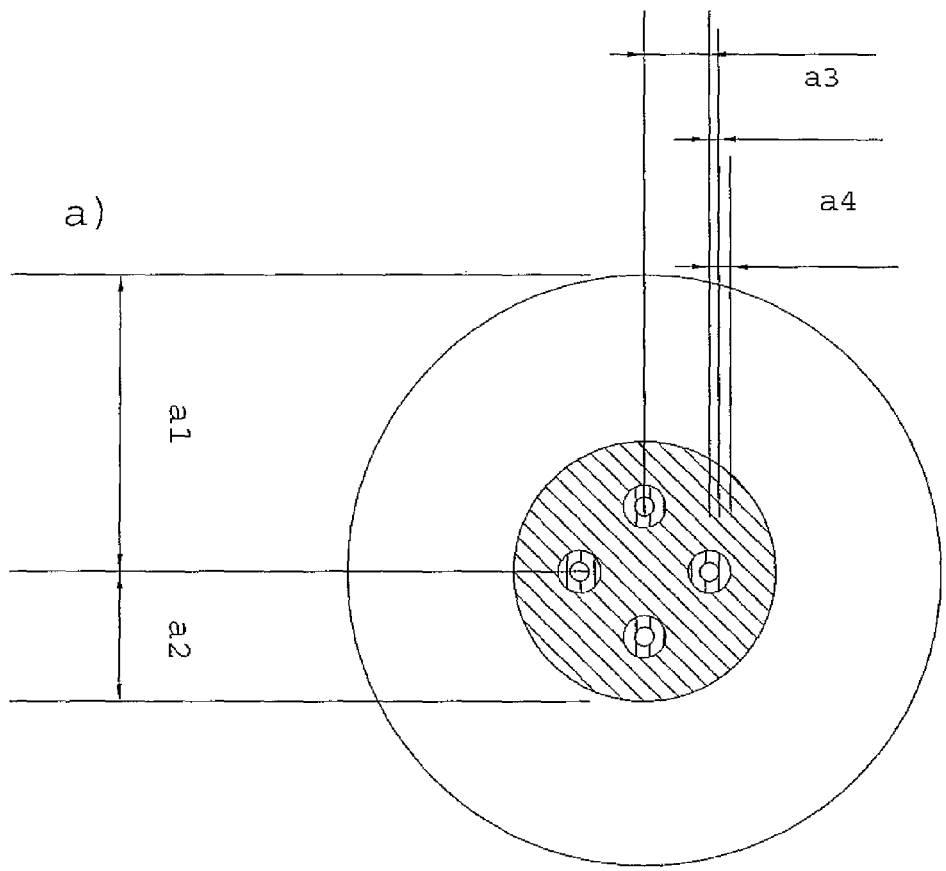
Fig. 14 a, b
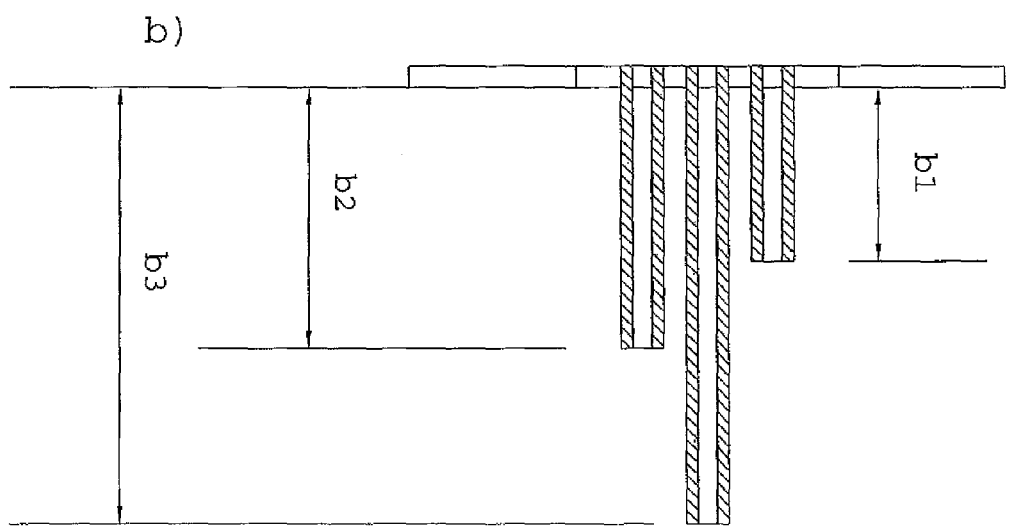

g

MODULAR REACTOR

The present invention relates to microreactors for chemical reactions and for mixing chemical substances.

Minireactors or micromixers are extremely miniaturised tube reactors with a tube or capillary diameter normally in the range of 0.2 mm to 5 mm. Owing to the small capillary diameter, the process materials and liquids are to be moved minimally in the reactor area.

The invention presented in DE 10 2004 038 555 B3 relates to a microreactor formed of corrosion-resistant material and constructed in a modular manner for the production of a mixed acid. The idea behind the microreactor described therein is to use the modularisation and miniaturisation to simulate the microreaction technology as a basis for the implementation in an industrial-scale system. For this purpose the individual modules consist of plastics material (PTFE) tubes (di=0.7 to 2 mm) which are assembled together via plastics material connections, which are also formed of the material PTFE, to form a microreaction module. The sealing material and the simple opening and connection of the modules are also described. The connection pieces may be designed as a linear, T-piece or crosspiece connections. Perforated disks, designed as small tantalum plates which comprise holes (5-800 µm), can be attached before the inlet or at the outlet. The cooling or heating necessary for carrying out the reaction may take place in a temperature-controlled bath. Micro-structures can be produced via the perforated disks, which leads to advantages within the field of microreaction technology in terms of the mixing of the reaction components and reaction materials.

DE 44 10 417 A1 relates to the reaction of toluene, nitric acid, sulphuric acid and water in any sequence in a reactor which is operated discontinuously or continuously and uses mixing elements. The reaction and mixing processes are to be designed in such a way that there is no backmixing. The mixing elements used for this may be static mixers, pumps, jets, stirrers or combinations thereof. Perforated plates, slotted plates, baffle plates, flow breakers, stirrers or similar fixtures can be used in the reactor in the case of continuous mixing of the reactants. The tube reactors also have fixtures for redispersal, flow breakers, baffle plates, static mixers or stirrers or integrated perforated plates.

WO 2007/032810 A2 describes a microreactor formed of stacked layers, into which microchannels are punched or etched. These channels are open and are used to route different liquid phases past one another and to transfer mass between the phases.

EP 1738820 A1 relates to a microfluid system formed of hollow filaments. A corresponding network formed of hollow fibres is applied via a heating block for heating.

The WO 2007/112945 A describes a microreactor system formed of individual plate parts, in which system microchannels are provided between the plate parts by corresponding spacers.

EP 1520838 A relates to a microfluid system in which a hollow fibre is embedded in the depression in a carrier.

DE 3429010 A1 describe's a delivery device for pulverulent building materials. In order to mix the materials thoroughly they are guided in a pipe which comprises baffles, for example prismatic, elliptical or rounded baffles, in order to thoroughly mix the transport flow. These building material pipes have a diameter of more than 50 mm.

WO 2005/123241 A relates to a line system for optical reactions which provides a radiation zone for UV irradiation. Specific radiation amounts and durations can be controlled by the type of lines. The reaction lines are ducts which are moulded directly into a plate.

JP 03014803 A (abstract) relates to a Venturi mixer for the thorough mixing of different solutions in order to provoke chemical reactions. The Venturi mixer has a constricted middle region for the inlet of liquids.

The problem addressed by the present invention is to provide improved modular reactors and parts thereof for a simple remodelling of a reaction concept.

A first embodiment of the present invention relates to a microreactor part comprising a plate body which has, on one plate side, a groove-shaped depression in which a reaction tube is accommodated, and the reaction tube has connection ends on the outer sides of the plate body. A primary field of application of such parts is the modular construction of microreactors formed of these parts. The plate bodies can be made of solid materials, such as steel, high-grade steel, ceramics, sintered metals, aluminium, plastics materials and nonferrous heavy metals. The microreactor part or plate body is preferably cuboid.

The depressions are used, in particular, to guide thermal transfer media, such as cooling or heating liquids, whilst the reactants are mixed in the reaction tube. The depression preferably forms a channel around the reaction tube. A thermal transfer medium, for example a cooling or heating liquid, can be guided in this elongate channel along the reaction tube. The thermal transfer medium can be supplied from one plate body to another plate body of a further module or microreactor part either internally or from the outside. The arrangement of the plates conforms to the requirements of the reaction. The entire reactor unit can be fastened by screwing or by other fixing mechanisms and can be sealed on the side of the groove-shaped depression. The depressions can be produced as milled recesses by sintering, casting or mechanical machining (milling, turning, drilling). Plate bodies can be of any length adapted to the requirements. They can also be composed of a plurality of individual plates via flanges and seals.

A reaction tube according to the present invention is a tube in which a reaction can take place when a medium flows through said tube. The tube itself is tight and aims to guide the medium in the interior of the tube. A mass transfer through the tube wall should not therefore take place—in particular not towards the groove-shaped depression in which, for example, a thermal transfer medium is guided.

A microreactor which is composed of one or more microreactor parts can be formed continuously as a tube reactor or tube-loop reactor, or else can be constructed stacked in a modular manner from the microreactor parts. If constructed stacked, the depression for guiding the thermal transfer medium can be sealed via the plates of the adjacent microreactor parts.

The reaction tube preferably ends at a sealing element on the outer side of the plate body, which sealing element preferably also closes the depression. The plate bodies may also have a seal on the upper face or lower face and can thus be connected to other plates so as to obtain a modular construction and simultaneously seal the depressions. The depression in the plate face is thus preferably sealed by a further plate. This further plate may be a further plate body of another microreactor part, an insulating plate with no reactor tubes or simply a thin sealing plate.

A seal, preferably a plastics material seal, is preferably accommodated along the plate frame of the plate body. For example this seal can be recessed in the plate frame for improved mounting. It is also possible to seal the different channels, which are formed by the groove-shaped depressions, on either side by further seals, it also being possible however to dispense with a specific plastics material seal and to seal the channels and the webs between the channels by tight contact with a sealing plate.

In a further preferred embodiment the plate body comprises fixing elements for fastening a plate or further microreactor parts to a plate face or adaptors of a fixing element, preferably notches for connecting rods. In order to fix individual microreactor parts together, the fixing element may consist of fixing clips which are interconnected by connecting rods and are fixed by locking clamps. Notches are preferably incorporated into the plate bodies for the connecting rods arranged on the sides of the microreactor parts. These also prevent mutual slipping of the plate bodies.

The plate body preferably comprises at least two reaction tubes. These at least two reaction tubes can be located in the same, possibly meander-shaped, groove-shaped depression. In further preferred embodiments at least three, at least four, at least five or at least six reaction tubes can also be accommodated in groove-shaped depressions in a microreactor part. For example the connection ends of the different reaction tubes can end at a or one outer side of the plate body in order to make it possible to connect different reaction tubes to one another in a simple and possibly modular manner depending on the application. Such reaction tubes of a microreactor part can be interconnected or reaction tubes can also be connected to reaction tubes of other microreactor parts ('plate connection'). In accordance with a specific embodiment, in the microreactor part the connection ends are connected to the outer sides of the plate body of the two reaction tubes via a connection element ('tube connector'). Connection elements between the individual tubes inside a microreactor part and between microreactor parts can further also have a fluid inlet or fluid outlet in order to admit and discharge reaction fluids into and from the reaction tubes.

The groove-shaped depression preferably has a meander-shaped course. Partition walls can be provided between meander-shaped portions of the course so as to ensure a continuous flow of a thermal transfer medium. The partition walls are preferably sealed, together with the plate frame of the plate body, by a plate. The reaction tubes can then be inserted into the groove-shaped depressions and are laid, for example, in a U-shaped manner, for example if a U-bend of the reaction tube lies in a meander loop for example and the connection ends of the reaction tubes end at an opposing meander loop on the outer side of the plate body. In accordance with this embodiment any number of reaction tubes can be provided in a plate body which can be heated or cooled by a thermal medium which can be guided in the groove-shaped depression. In accordance with the modular reactor construction, a temperature level could then be set per microreactor part which differs from other temperature levels of other microreactor parts.

A connection end of a reaction tube or a fluid inlet or fluid outlet of a connection element preferably comprises a fluid mixer. For example a fluid mixer is a flow breaker, flow accelerator, mixing jets or a protruding injection needle or mixing lance. Mixing jets can be attached to the end of the outwardly guided tubes which project into the connection element, which mixing jets cover the tube end as perforated disks. By introducing holes into the mixing jets the speed of the outgoing liquid can be adapted in such a way that the flow of the fluid, which for example enters opposite and is to be mixed in, is mixed in perfectly. After the first mixing and combining of two fluids, a further mixing jet can be incorporated before the entry into the next tube of the reactor for renewed mixing. For example mixing jets can be made of gold, platinum, high-grade steel, nonferrous heavy metal, plastics material, ceramics, sintered material. Instead of a mixing jet a porous sintered metal can also be used as an alternative fluid mixer. A porous sintered metal can also be used as a mixing jet. The aim of the fluid mixer is generally to supply fluids as turbulently as possible and to combine two fluids as completely as possible, wherein laminar flows, which may lead to segregation, are interrupted.

Gases can also be mixed with gases or with liquids. At the same time, the connection element can also be designed as a heat exchanger and simultaneous static mixer. The fluid mixer preferably comprises a plurality of mixing zones, for example by attaching an injection lance with a plurality of openings or by using a plurality of injection lances of different length which protrude at different points into the tubes or connection elements. What are known as 'hot spots' are avoided during the mixing-in process owing to such a staggered mixing process (Losey et al., Ind. Eng. Chem. Res., 40 (2001): 2555-2562).

In accordance with a further embodiment it is also possible to arrange a sensor, in particular a temperature sensor, preferably in conjunction with a thermostat, optical sensor or refractive index sensor, preferably with a measuring prism, in a reaction tube or to attach it to a connection end.

Furthermore, a connecting block can also be designed in such a way that in-line measuring devices can be incorporated for monitoring, controlling and regulating reactions (for example connection for GC, HPLC, NIR, DSC, viscosity measuring devices, pH measuring devices, temperature and pressure measuring devices, flow rate measuring devices, refractive index, in-line refractometers, etc.).

Catalysts (for example incorporated in a cage) can also be incorporated in the tubes, connection elements or connection parts at the connection ends of the tubes so reactions can also be carried out over catalytically large surfaces.

A connection element can also be designed at the connection end of a tube in such a way that an overpressure controller, such as emergency relief holes or rupture disks, is installed for pressure relief. In accordance with the present invention it is therefore preferable for a connection end of a reaction tube to be connected to an overpressure controller, preferably a pressure relief valve, a rupture disk or plug. In a further aspect of the invention, the present invention relates to a reaction tube with a cross-sectional constriction as a mixing element, wherein the cross-section on (merely) one side of the tube, preferably a round tube) is constricted by at least 15%, preferably at least 20%. The reaction tube preferably also comprises cross-sectional enlargements, for example by at least 15%, preferably at least 20% of the tube cross-section. Cross-sectional constrictions and enlargements are preferably provided in a regularly alternating manner. The cross-sectional constriction is particularly advantageously only on one side of the tube cross-section and the cross-section is thus asymmetrically constricted. With such an asymmetrical narrowing the fluid flow is deflected, which leads to particularly efficient mixing. In particular when mixing fluids which are immiscible per se, which form emulsions or dispersions for example, the flow is deflected here and the two fluids, which otherwise may have segregated, are mixed. The reaction tube thus advantageously comprises cross-sectional constrictions over the extent of the tube of at least 15%, preferably at least 20% of the cross-sectional area on one side of the tube cross-section. In addition, the tube preferably also comprises cross-sectional enlargements which, in addition to the cross-sectional constrictions, also promote the turbulent flow.

The tube cross-section is preferably not enlarged compared to the constriction and/or 90° to the constriction or is not enlarged by more than 10% of the tube cross-section. For example the cross-section may form a semi-circle at the constriction.

The reaction tube preferably comprises a plurality of cross-sectional constriction. In this case the side of the cross-sectional constriction in the tube cross-section can change in an alternating sequence. The cross-sectional constriction can be arranged at any angles to the axis of the tube, in particular at an angle of 0-180° to the axis of the tube, more specifically at 90°. The cross-sectional constriction can adopt any shape, for example they may be wedge-shaped, straight, prismatic, cylindrical or spherical. Owing to an alternating constrictions there is a particularly turbulent flow and circulation of the fluid mixture. The cross-sectional constrictions can thus also follow the reaction tube in a spiraled manner and can also be oriented relative to one another, for example in that the cross-sectional constrictions are opposingly offset in the tube cross-section. The cross-sectional constrictions are advantageously produced by squeezing the tube, for example through a wedge-shaped, straight, prismatic, cylindrical or spherical body.

In addition, at least 10%, preferably 10% to 90, in particular 15% to 70% of the tube length preferably comprises cross-sectional constrictions. The constrictions can connect to one another directly or can be separated by tube portions which are not constricted and are preferably also not enlarged. These tube portions can comprise approximately at least the length of a constricted portion, at least double, at least three times or at most four times the length of a constricted portion.

The reaction tubes per se or in the microreactor part, as described in general above, can be produced from steel, high-grade steel, ceramics, sintered metals, aluminium, plastics material, nonferrous heavy metals or noble metals. Preferred tube materials are all iron, iron alloys, chromium-nickel steels, nickel steels (for example Hastelloy materials), titanium, tantalum, silicon carbide, glass, ceramics, gold, platinum and also plastics materials. In preferred embodiments the tube cross-sections are round or elliptical, in the form of a segment of a circle, square, rectangular or polygonal, in particular 5-, 6-, 7- or 8-sided. The tube cross-sections can be symmetrical, for example mono-symmetrical or multi-symmetrical, for example about one or at least two, three or at least four mirror planes. In preferred embodiments these tube cross-sections reproduce the shape of the inner cross-section of the tube. The outer shape may optionally comprise a different shape or the same shape as the inner cross-section. The tubes may be straight, curved in accordance with different patterns or may comprise specific cross-sectional constructions which affect the flow guided internally in such a way that the media are mixed in the tube by flow deflection. The constructions can be arranged over the tube in any pattern (even recurrent). This is a decisive advantage over known tube reactors with fixtures for mixing the reactants. For example squeezing elements can be attached externally to plastics material tubes in order to obtain the corresponding squeezing of the tube. Flexible tube material can therefore be used in addition to rigid materials. In preferred embodiments the carrier materials of the microreactor part are selected from iron, iron alloys, chromium and chromium-nickel steels, nickel steels (Hastelloy materials), titanium, tantalum, silicon carbide, glass, ceramics, gold, platinum, plastics material or other sub-group metals and transition metals as well as mixtures thereof.

The tubes of the reactor according to the invention and the tubes according to the invention can also be provided as bulk materials (for example as shown in FIG. 15), for example in separated form, such that the reaction tubes can only be created by the connection of such separated components and the reaction tubes can be formed of (for example drilled out from) the bulk material.

The reaction tubes are preferably capillaries with an inner diameter of 0.05 mm to 1 mm or further tubes of at least 1 mm up to diameters which are feasible in terms of manufacture, for example up to 20 mm, up to 15 mm, up to 10 mm, up to 8 mm or up to 5 mm. The reaction tubes can be accommodated in the groove-shaped depression from the outside. These reaction tubes are preferably used in the microreactor part.

The reaction tubes can be embedded in various forms in the microreactor parts, for example in a wavy or meandering manner, and may be jagged in a saw-tooth-shaped or rectangular manner with various deflections which promote mixing (FIGS. 16a-f). The reaction tubes are inserted into the groove-shaped depressions in the microreactor part, wherein the groove-shaped depression is adapted to guide therein a thermal transfer medium or to accommodate other heating materials, for example an induction coil for inductive heating of the tube. The embodiment with an induction coil is particularly preferred, since particularly high temperatures can thus be set over selected tubes or tube portions. A conventional inductive, for example high-frequency coil can be used for this purpose and is preferably arranged wound around the tube.

In a further aspect the present invention relates to a microreactor comprising at least two microreactor parts, each having a plate body which has, on one plate side, a groove-shaped depression in which a reaction tube is accommodated and the reaction tube has connection ends on the outer sides of the respective plate body, reaction tubes of the different microreactor parts being connected via connection ends via a connection element.

Connection elements are preferably connecting blocks which can be attached in a simple and modular manner to the outer side of the reactor parts. Tubes for guiding the reaction products are inserted into the depressions in the microreactor parts. Passages through the housing plate are arranged at one end, through which passages the reaction tubes can be inserted and extend via seals into reaction tube connection elements, for example in the form of connecting blocks. The connection elements may serve either merely as a deflection and connection to the next tube, or else may also be designed as feed points, mixing points, or product offtake. As a result of this arrangement and depending on the reaction and reaction time requirement, the reaction tubes can be bypassed by adapted connecting blocks or corresponding tube connections, thus increasing flexibility and modularity. Materials of the connection elements may be: steel, high-grade steel, ceramics, sintered metals, aluminium, plastics material, nonferrous heavy metals or noble metals. Connection elements may also comprise holes for feeding and removing cooling or heating media into and from the groove-shaped depressions.

A microreactor part of the microreactor is preferably as defined above. In particular the microreactor preferably comprises at least two or more of the microreactor parts according to the invention.

In specific embodiments a reaction tube comprises a microreactor part, preferably all microreactor parts, and at least two connection ends which both end on an outer side of the plate body of the respective reactor block. These connection ends ending on the same outer side of the plate body can easily be connected to one another in a modular manner, in particular by the above-mentioned connection elements, such as connecting blocks, which may be joined to the plate body with a form fit.

In further embodiments the reaction tubes can be connected by a connection element which optionally comprises an inlet or outlet for reaction fluid into or from the reaction tube, and/or an inlet or outlet for fluid into or from a channel which is formed by the groove-shaped depression. The reaction tubes of the different microreactor parts can generally be connected by plug connections, pipes or tubes.

The modular microreactor according to the invention makes it possible to accommodate different microreactor parts which may represent different temperature levels in various sequence if they are heated or cooled differently by the thermal transfer medium guided in the depressions. It is therefore preferred for a thermal insulation element to be provided between individual microreactor parts. Such a thermal insulation element can be, for example, a plate made of insulating material or individual insulating bodies which are fixed between the two plates in order to achieve a spacing.

In a further aspect the present invention relates to a kit for producing a microreactor comprising a microreactor part, preferably at least two microreactor parts as defined above, and preferably a connection element for connecting the reaction tubes of the microreactor parts. The invention also relates to a method for producing a microreactor by assembling microreactor parts and optionally connecting reaction tubes. In particular, the kit also comprises fixing elements for positioning individual microreactor parts, such as fixing clips, connecting rods and locking clamps. Individual tubes can further be provided for connecting temperature-control media for circulation in the groove-shaped depressions.

A further aspect of the present invention relates to the use of a microreactor part as described above, the reaction tube or microreactor for mixing two fluids in the reaction tubes. As already described above, it is particularly advantageous if the reaction tubes according to the invention comprising the cross-sectional reductions, such as notches caused by bends, are used both to increase the turbulence of the flow through the tubes and to deflect the fluids asymmetrically. It is therefore particularly preferred if the fluids form an emulsion or dispersion and, for example, are not otherwise physically miscible. In accordance with a further embodiment the mixing is preferably carried out by using the microreactor parts, reaction tubes or reactors according to the invention in order to bring about a chemical reaction of the two fluids. Of course, more than two fluids may also be used, for example two fluids can first be mixed in accordance with the microreactor and a third fluid can be added and mixed through a further inlet, etc. Reactants and also reaction terminators can be used as fluids. A microreactor comprising at least two microreactor parts is preferably used to heat or cool the reaction tubes of the microreactor parts to different temperatures, preferably by a thermal transfer medium, preferably water, which is guided in the groove-shaped depressions.

Thermal carriers are, for example, heating or cooling fluids and can be, for example: liquids, steam or gases. The thermal carrier can be guided in co-current flow, counterflow or cross-flow to the fluid or reaction mixture flowing in the reaction tubes. The thermal carrier can be fed into each individual plate body and removed therefrom or connected in series or in parallel.

In additional embodiments which can be combined or are alternative, one or more induction coils are used in the groove-shaped depression in order to heat the tube or the tube portions. Temperatures of 200° C. to 600° C. or more are possible with the inductive heating. This is therefore particularly preferred for high-temperature reactions. For inductive heating the groove-shaped depressions are preferably free from liquids, apart from the induction coils. If there is a distance from the tube, the depressions can be gas-filled or else void of air and may abut the induction coils and the reaction tubes with a form fit.

The two fluids are preferably mixed at a mixing point thereof at different speeds, preferably at least at twice, preferably at least three times, in particular at least four times the speed differences. The two fluids are thus diffused and this consequently leads to efficient mixing.

The two fluids preferably also meet one another at the mixing point at an angle of 140° to 220°, preferably 160° to 200°, in particular preferably 180°. This promotes the above-mentioned diffusion of the two fluids. The fluids may continue to flow further, for example offset at 90° to the inlet tubes of the two fluids to be mixed. For example a fluid, which has already passed through a reaction tube in the microreactor part, can be fed through a reaction tube and a second fluid can be added through an inlet on the connection element. The mixture is then guided further into a further reaction tube in the microreactor part. The speed of the two fluids at the mixing point can be adjusted by the pressure and cross-section of a mixing jet, preferably by selecting an aperture plate comprising a specific number of apertures. Owing to specific prefabricated aperture plates comprising specific cumulative opening cross-sections, for example set by a specific number of apertures of constant opening cross-section, a modular microreactor according to the present invention can be adjusted for specific applications and flow rates.

The tubes of the microreactor are also adapted for high-pressure reactions, and for example the inlet pressure of a fluid can thus be at least 1 bar, at least 5 bar, preferably at least 8 bar, specifically preferably at least 10 bar. However, these exemplary pressures are not to be regarded as limiting, but merely as preferred examples. The inlet pressure of the fluid can, of course, be selected depending on geometry, number of tubes or flow breakers (for turbulent, swirled flows) and the associated pressure loss. An appropriate feed means (volumetric or mass-related) is preferably used and can apply the pressure losses of the reactor (0-160 bar).

One of the fluids which is guided in the reaction tubes is preferably a liquid and a second fluid, which is mixed with the first fluid in the reaction tube, is preferably a liquid, a gas or a supercritical fluid. In accordance with the present invention any combinations of different fluids are made possible, for example liquid-liquid mixtures, gas-liquid mixtures, gas-supercritical fluid mixtures or liquid-supercritical fluid mixtures can be introduced and mixed. It is also possible to mix liquids, gases or supercritical fluids with swirled and fluidised solid particles. Fluidised solid particles are also, for example, catalyst particles which are used for the chemical reaction.

The present invention is preferably defined as follows.

1. A microreactor part comprising a plate body which has, on one plate side, a groove-shaped depression in which a reaction tube is accommodated, and the reaction tube has connection ends on outer sides of the plate body.

2. The microreactor part according to definition 1, characterised in that the body is cuboid.

3. The microreactor part according to either definition 1 or definition 2, characterised in that the depression forms a channel around the reaction tube.

4. The microreactor part according to any one of definitions 1 to 3, characterised in that the reaction tube ends at a sealing element on the outer side, which sealing element also preferably closes the depression.

5. The microreactor part according to any one of definitions 1 to 4, characterised in that the depression in the plate face is sealed by a further plate.

6. The microreactor part according to any one of definitions 1 to 5, characterised in that a seal, preferably a plastics material seal, is accommodated along the plate frame of the plate body.

7. The microreactor part according to any one of definitions 1 to 6, characterised in that the body comprises fixing elements for fastening a plate or further microreactor parts to a plate side and adaptors of a fixing element, preferably notches for connecting rods.

8. The microreactor part according to any one of definitions 1 to 7, characterised in that the reaction tube comprises cross-sectional constructions over the extent of the tube of at least 20% of the cross-sectional area on one side of the tube cross-section, preferably as a result of tube bends, and/or comprises cross-sectional enlargements.

9. The microreactor part according to any one of definitions 1 to 8, characterised in that the plate comprises at least two reaction tubes, preferably in the same, possibly meander-shaped, groove-shaped depression.

10. The microreactor part according to definition 9, characterised in that the connection ends are connected to the outer sides of the plate body of the two reaction tubes via a connection element ('tube connector').

11. The microreactor part according to definition 10, characterised in that the at least one connection element has a fluid inlet or fluid outlet.

12. The microreactor part according to any one of definitions 9 to 11, characterised in that the groove-shaped depression has a meander-shaped course and partition walls are provided between meander-shaped portions of the course, the partition walls preferably being sealed, together with the plate frame of the plate body, by a plate.

13. The microreactor part according to any one of definitions 1 to 12, characterised in that a connection end of a reaction tube or a fluid inlet or fluid outlet of a plug element comprises a fluid mixer.

14. The microreactor part according to definition 13, characterised in that the fluid mixer is a flow breaker, flow accelerator, mixing jets or a protruding injection needle.

15. The microreactor part according to any one of definitions 1 to 14, characterised in that a sensor, in particular a temperature sensor, preferably in conjunction with a thermostat, optical sensor or refractive index sensor, preferably with a measuring prism, is arranged in a reaction tube or attached to a connection end.

16. The microreactor part according to any one of definitions 1 to 15, characterised in that a connection end of a reaction tube is connected to an overpressure controller, preferably a pressure relief valve, a rupture disk or plug.

17. The microreactor part according to any one of definitions 1 to 16, characterised in that the reaction tube is made of metal, ceramics or plastics material.

18. A reaction tube comprising a cross-sectional constriction as a mixing element, the cross-section being constricted on one side of the tube, preferably a round tube, by at least 15%, preferably at least 20%.

19. The reaction tube according to definition 18, characterised in that the tube cross-section is preferably not enlarged compared to the reduction, preferably also 90° to the constriction, and the cross-section preferably forms a semi-circle at the constriction.

20. The reaction tube according to either definition 18 or definition 19, which comprises a plurality of cross-sectional constrictions, the side of the cross-sectional constriction preferably changing in an alternating sequence, in particular the cross-sectional constrictions being spiraled or opposingly offset in the tube cross-section, and/or the cross-sectional constrictions preferably being straight, prismatic, cylindrical or spherical.

21. The reaction tube according to any one of definitions 18 to 20, wherein at least 10% of the tube length comprises cross-sectional reductions. This reaction tube is preferably used in the microreactor part.

22. A microreactor comprising at least two microreactor parts, each having a plate body which has, on one plate side, a groove-shaped depression in which a reaction tube is accommodated and the reaction tube has connection ends on outer sides of the respective plate body, reaction tubes of the different microreactor parts being connected via connection ends via a connection element.

23. The microreactor according to definition 22, characterised in that at least one, preferably at least two of the microreactor parts is/are further characterised in accordance with any one of definitions 1 to 17.

24. The microreactor according to either definition 22 or definition 23, characterised in that a reaction tube of a microreactor part, preferably all microreactor parts, comprises connection ends which both end at an outer side of the plate body of the respective reactor block.

25. The microreactor according to any one of definitions 22 to 24, characterised in that the reaction tubes are connected by a connection element which optionally comprises an inlet or outlet for reaction fluid into or from the reaction tube, and/or an inlet or outlet for fluid into or from the channel of the depression.

26. The microreactor according to any one of definitions 22 to 25, characterised in that the reaction tubes of the different microreactor parts are connected by plug connections, pipes or tubes.

27. The microreactor according to any one of definitions 22 to 26, comprising a thermal insulation element between two microreactor parts.

28. A kit for producing a microreactor according to any one of definitions 22 to 27, comprising a microreactor part, preferably at least two microreactor parts according to any one of definitions 1 to 17, and preferably a connection element for connecting the reaction tubes of the microreactor parts.

28. A use of a microreactor part according to any one of definitions 1 to 17, a reaction tube according to any one of definitions 18 to 21 or a microreactor according to any one of definitions 22 to 27 for mixing two fluids in the reaction tubes.

29. The use according to definition 28, characterised in that the two fluids form an emulsion or dispersion.

30. The use according to either definition 27 or definition 28 in order to additionally bring about a chemical reaction of the two fluids.

31. The use according any one of definitions 28 to 30, characterised in that a microreactor comprising at least two microreactor parts is used to heat or cool the reaction tubes of the microreactor parts to different temperatures, preferably by a thermal transfer medium, preferably water, which is guided in the groove-shaped depressions.

32. The use according to definition 31, characterised in that the thermal transfer medium is guided in counterflow or in co-current flow to the reaction mixture in the reaction tube.

33. The use according to any one of definitions 28 to 32, characterised in that the two fluids are mixed at the mixing point thereof at different speeds, preferably at least at twice, preferably at least three times, in particular at least four times the speed differences.

34. The use according to any one of definitions 28 to 33, characterised in that the two fluids meet one another at the mixing point thereof at an angle of 140° to 220°, preferably 160° to 200°, in particular preferably 180°.

35. The use according to any one of definitions 28 to 34, characterised in that the speed of the two fluids at the mixing point is adjusted by the pressure and cross-section of a mixing jet, preferably by selecting an aperture plate comprising a specific number of apertures.

36. The use according to any one of definitions 28 to 35, characterised in that the inlet pressure of a fluid is at least 1 bar, preferably at least 5 bar, specifically preferably at least 10 bar.

37. The use according to any one of definitions 28 to 36, characterised in that one of the fluids is a liquid and a second fluid is a liquid, a gas or a supercritical fluid.

The present invention will further be explained in greater detail by the figures and examples below, but is not limited to these.

Figure 7A:
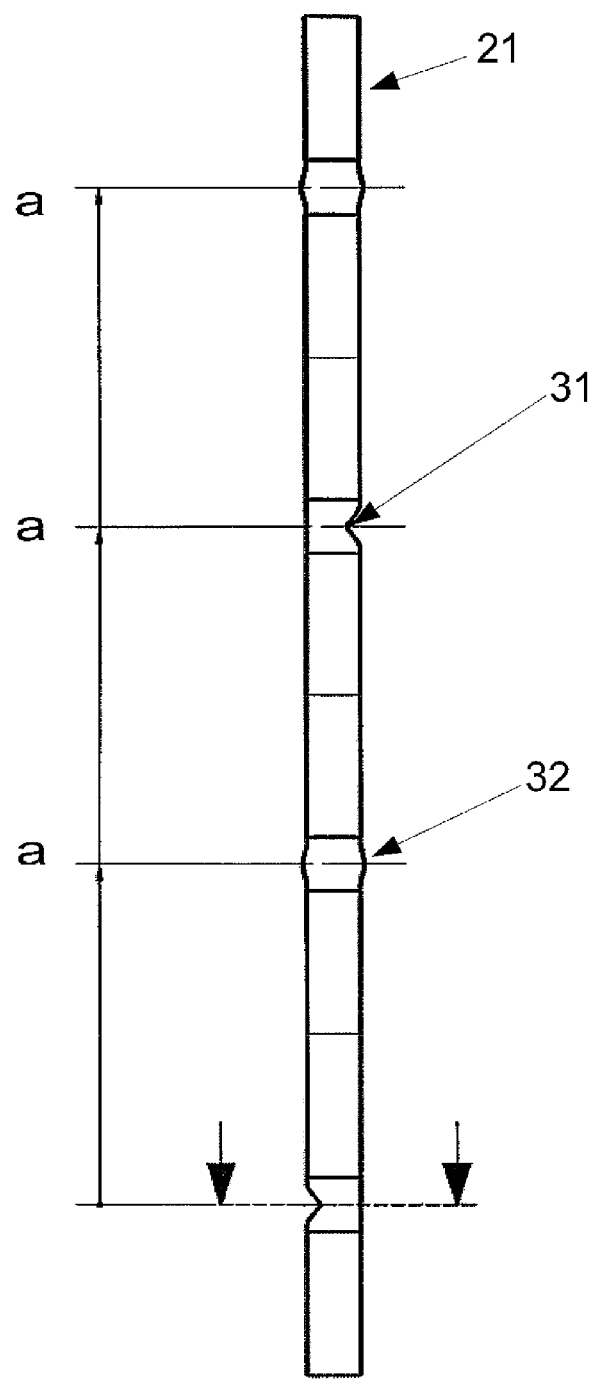
Figure 8:
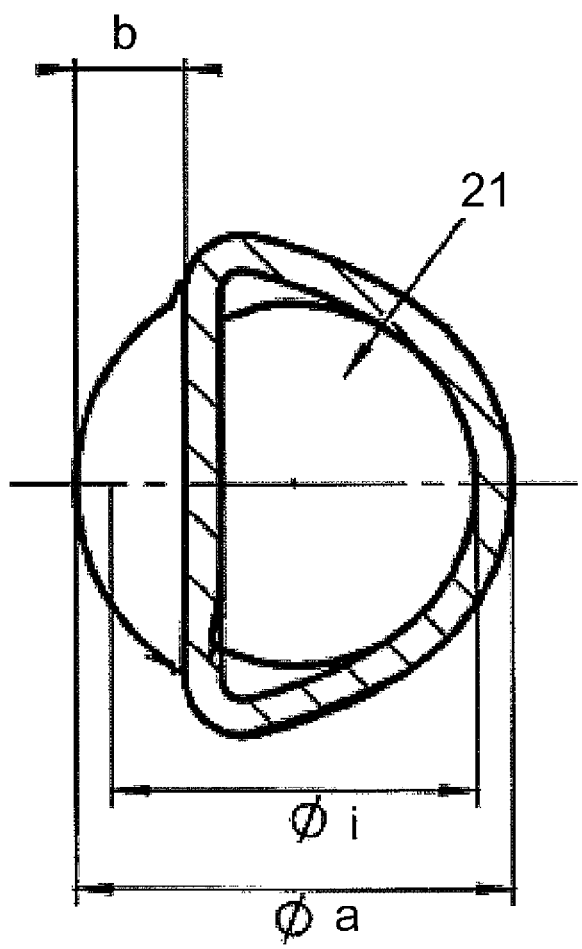
Figure 9:
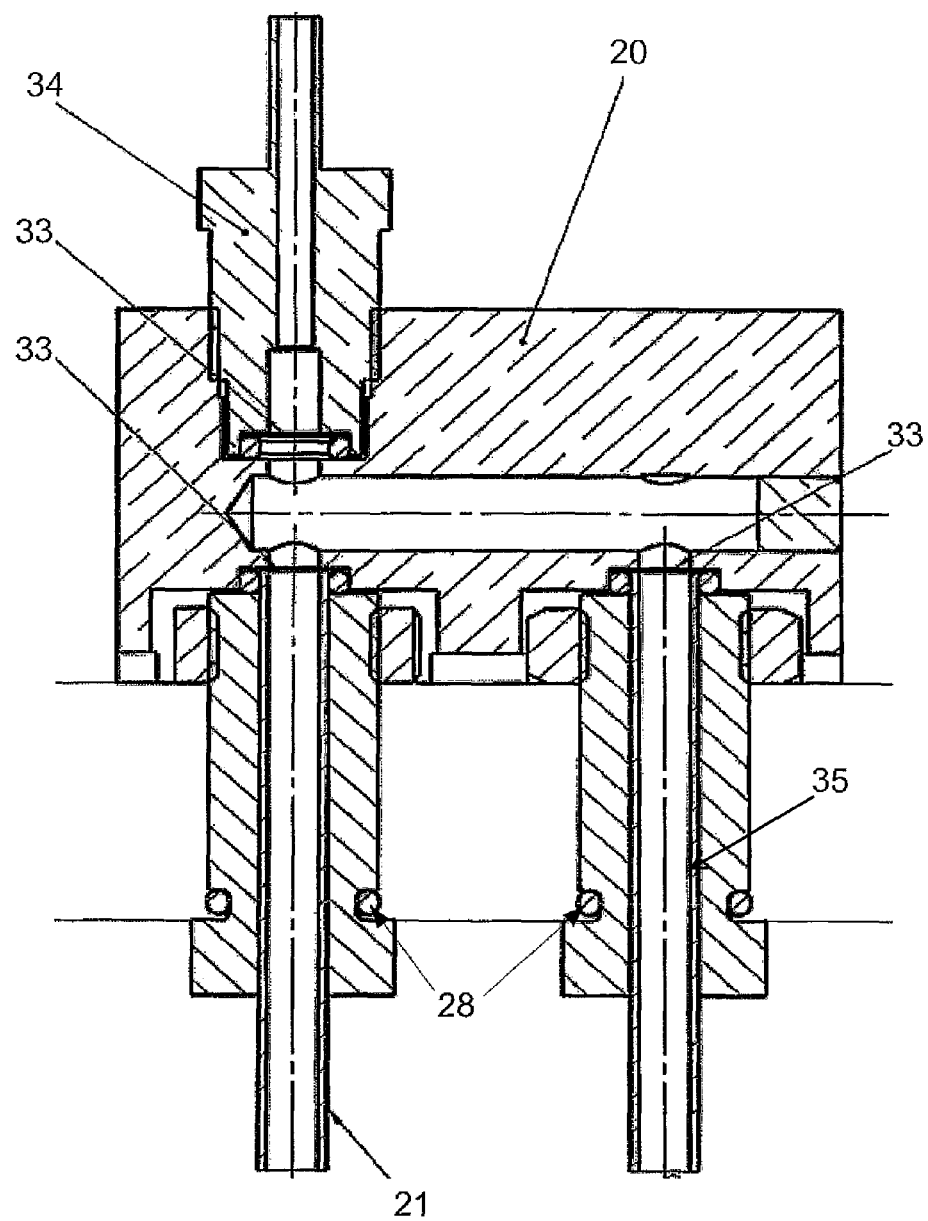
Figure 10:
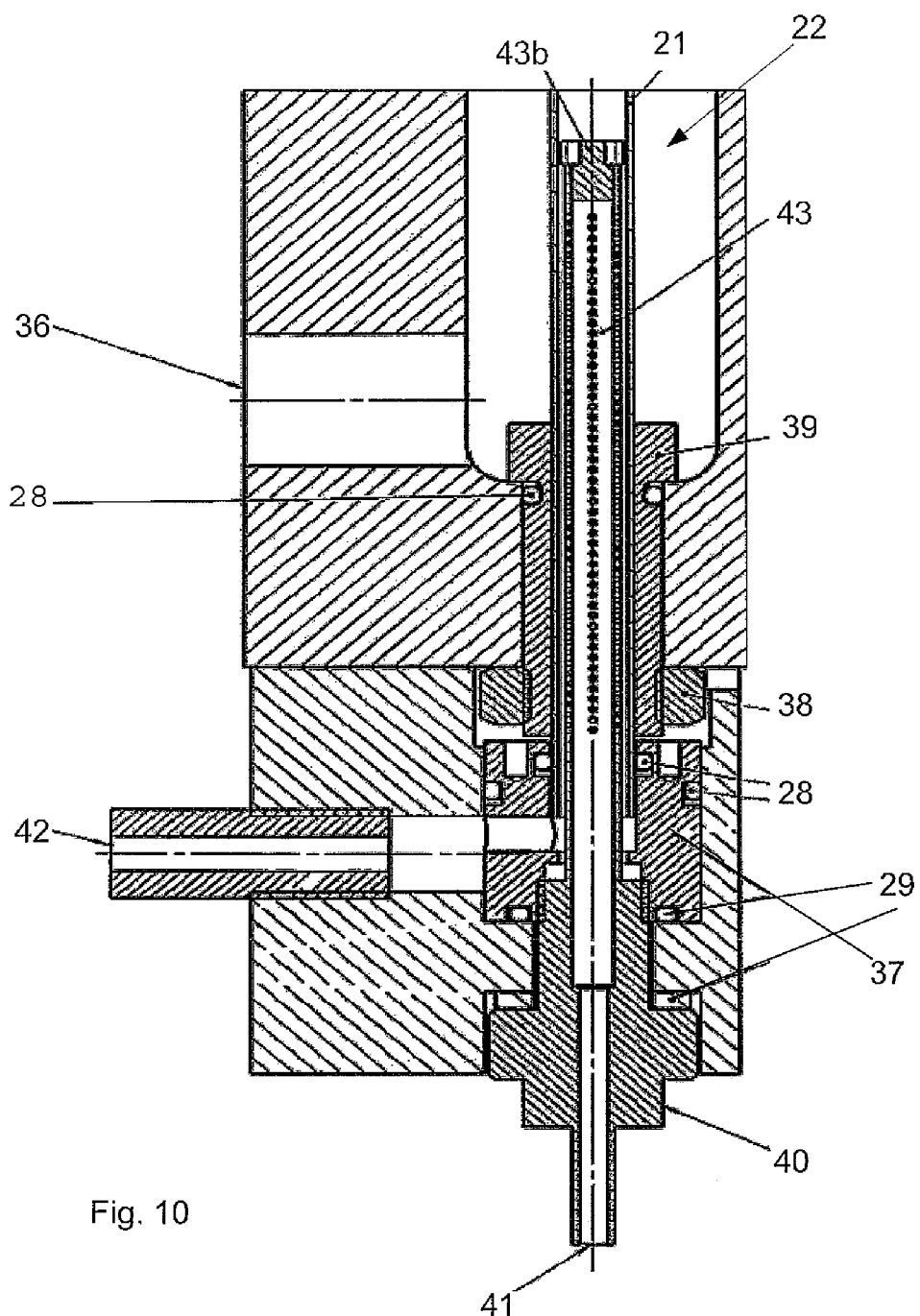
Figure 11:
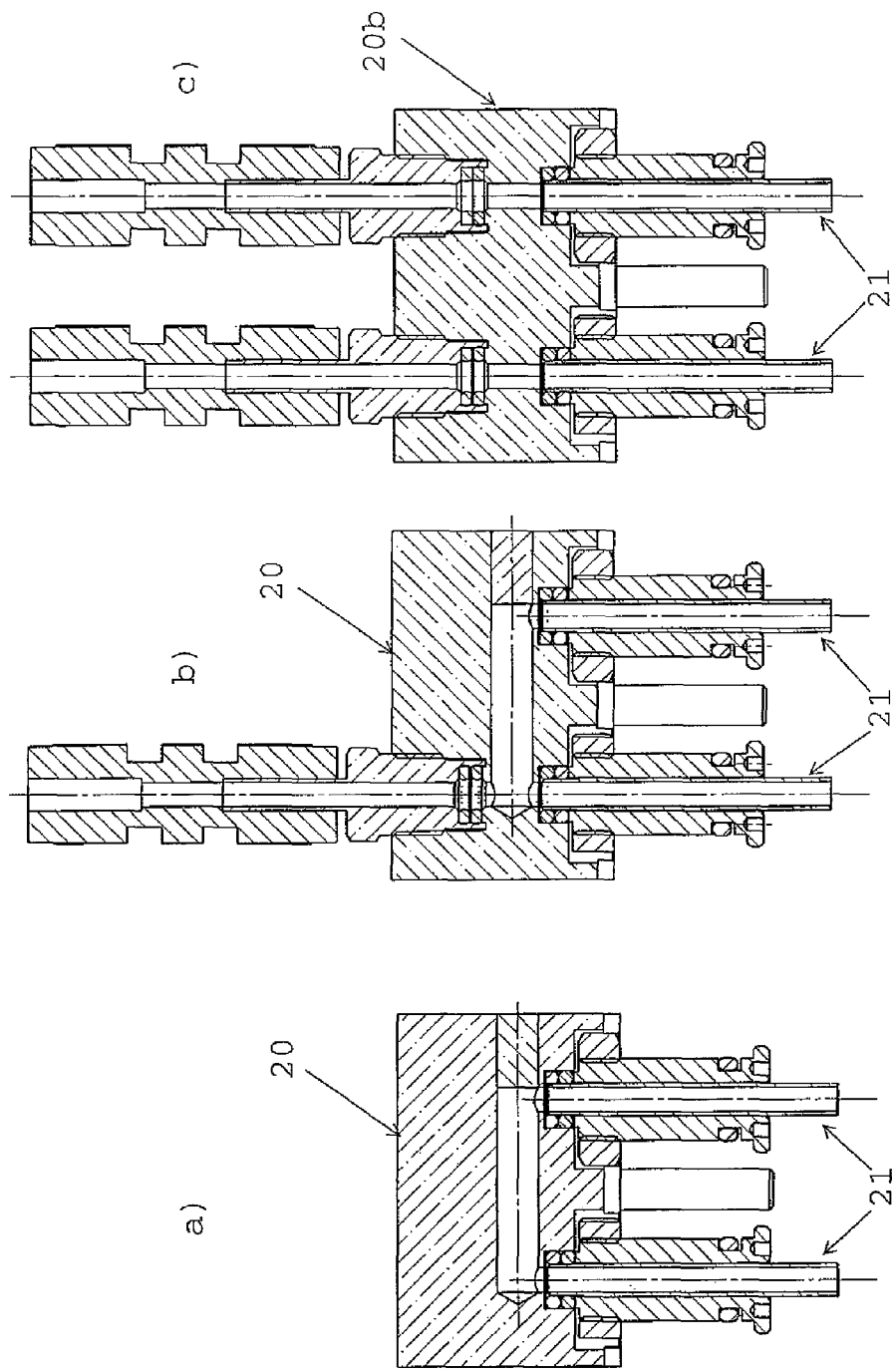
Figure 13:
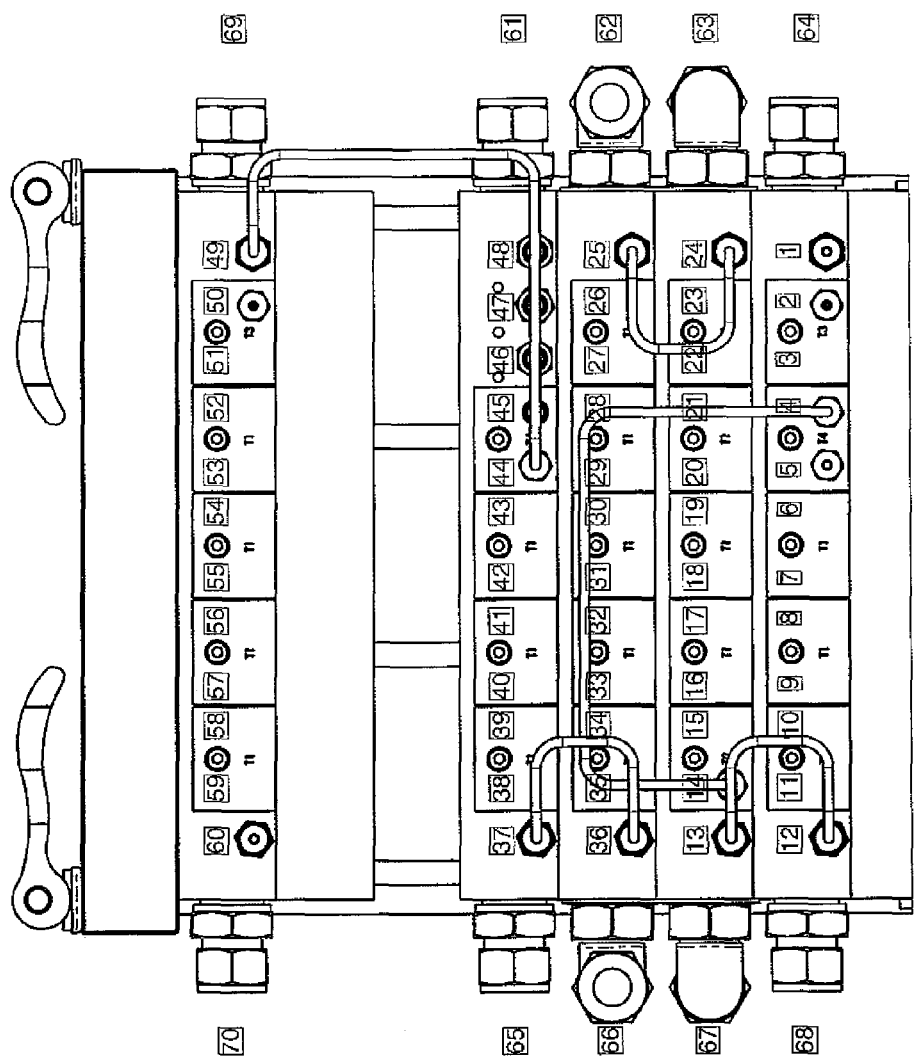
Figure 15:
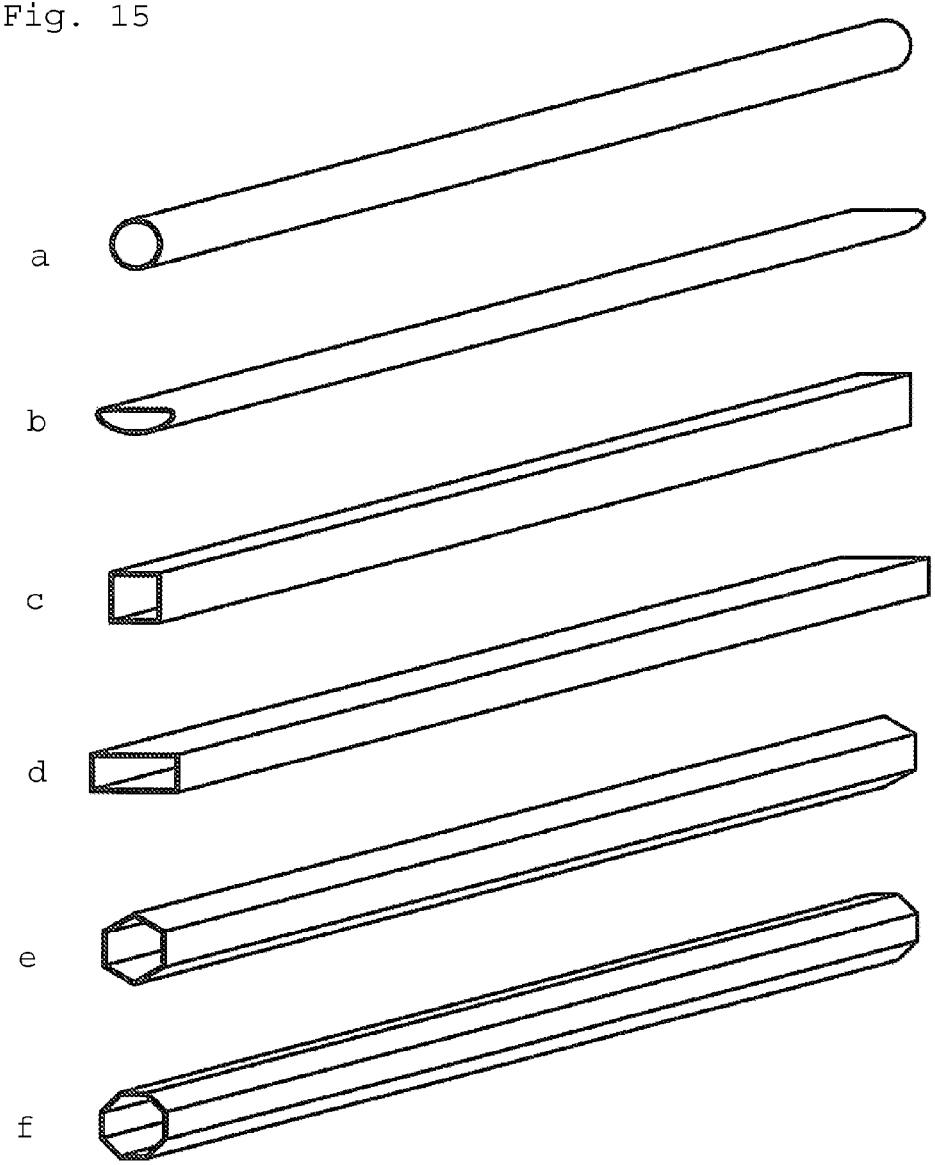
Figure 15:
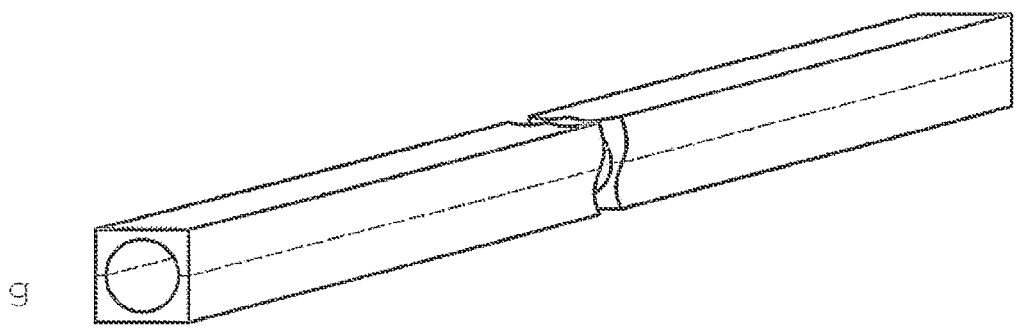

FIGS. 7a, b and c show reaction tubes with cross-sectional reductions and cross-sectional enlargements;

FIG. 8 shows a one-sided cross-sectional constriction of a reaction tube;

FIG. 9 shows a section through a connection element in plan view, this connection element comprising an additional fluid inlet or fluid outlet;

FIG. 10 shows a connection part comprising a mixing lance with a plurality of holes which project into the reaction tube;

FIG. 11 a) shows a connection plug element, b) shows a connection plug element comprising an additional fluid inlet or outlet, and c) shows a connecting block with no tube connector comprising two inlets or outlets for adjacent reaction tubes;

FIG. 12 shows a front and side view of the microreactor which is arranged on a transport or assembly mount;

FIG. 13 shows a front view of a microreactor with a specific connection assembly of individual reaction tubes, the numbers given being based on positions to which reference is made in examples 2 and 3; and FIG. 14 shows a perforated disk as a mixing element for use in a mixing jet which comprises mixing lances of different length, a) cross-sectional view, b) sectional side view;

FIG. 15 shows different tube shapes and tube cross-sectional shapes, in particular (a) circular, (b) segment of a circle, (c) square, (d) rectangular, (e) rectangular, (f) octagonal. FIG. 15g shows a shaped tube with a circular inner cross-section and a rectangular outer cross-section in a separable embodiment.

Figure 16:
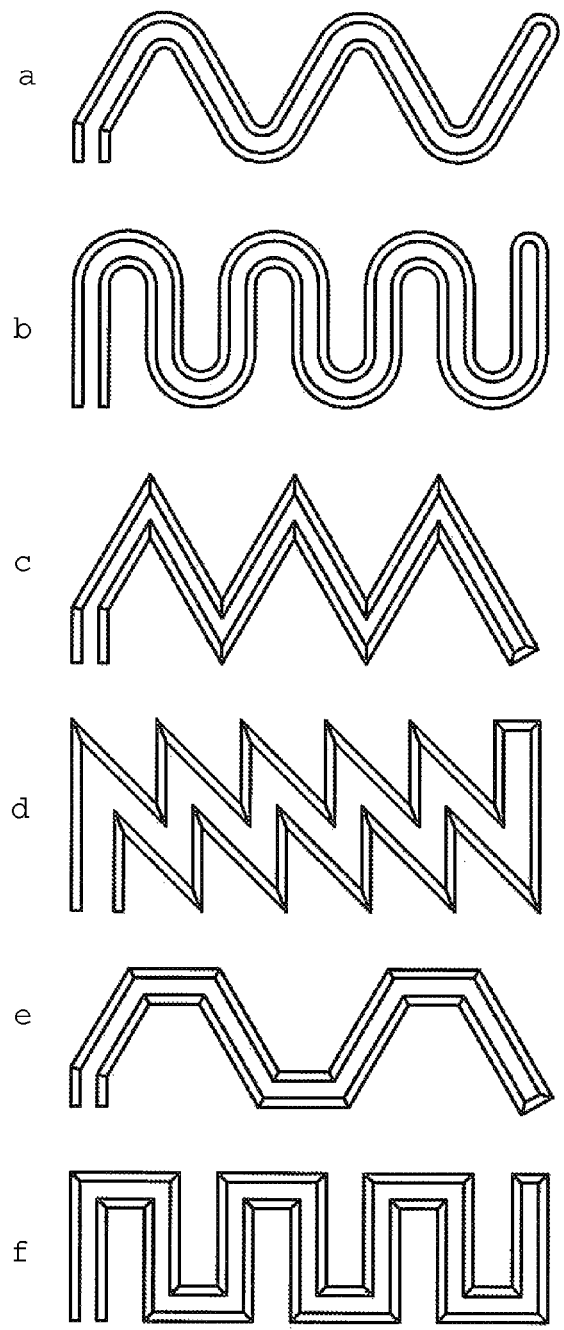

FIG. 16 shows different tube shapes which can be laid in a microreactor part, in particular (a) winding, (b) serpentine, (c) jagged, (d) saw-tooth, (e) angled or (f) rectangular tube bend shapes.

Figure 17:
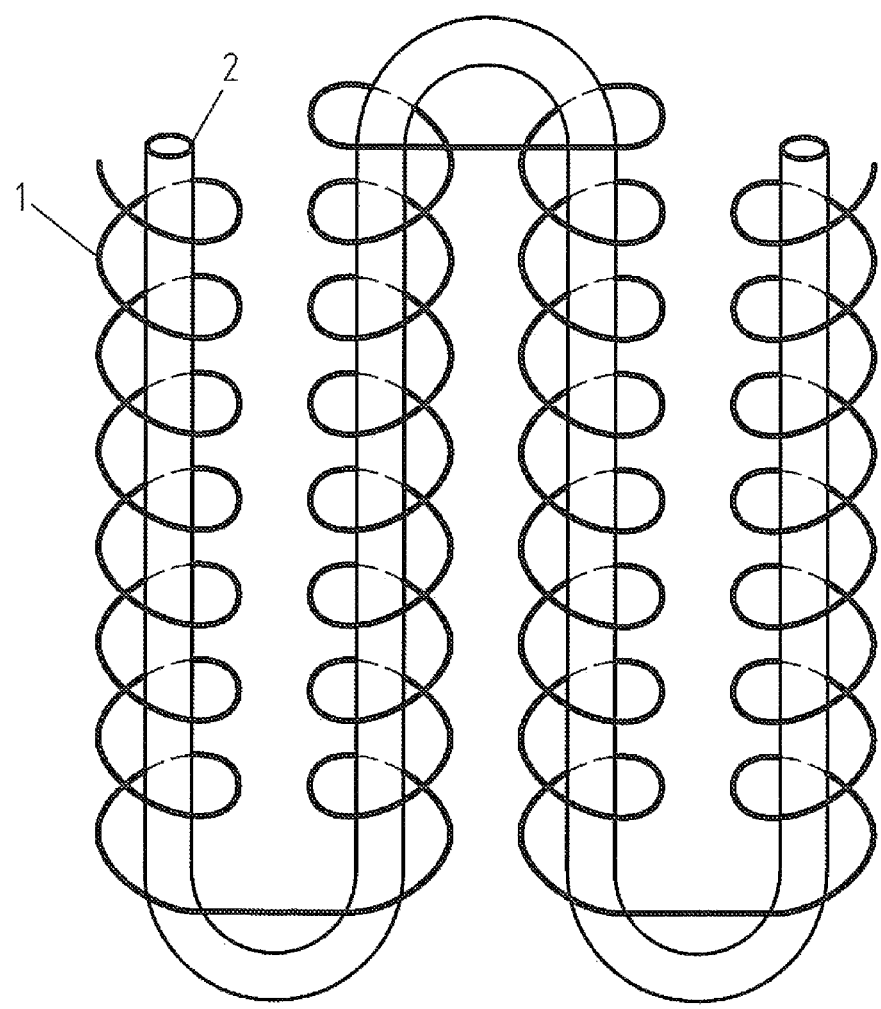

FIG. 17 shows a reaction tube (2) with a wound spiral (1) for inductive heating of the tube.

EXAMPLES

Example 1

Description of the Assembly

The microreactor is characterised by a modular construction, whereby parameters such as residence time, etc. can be adapted to the different reactions.

A modular plate or a microreactor part 1 consists of a plate body in which the reaction tubes 21 are guided in depressions 22. The reaction tubes 21 are stabilised by U-shaped mounts 24 in the depressions 22. The tubes are supplied with the reaction media on the front side. The depressions in the plate body 1 act as a guide for the cooling or heating liquid in order to adjust the temperatures required for the reaction. The microreactor is designed as a heat exchanger and the cooling or heating processes can be carried out in co-current flow and also in counterflow. The supply 9, 10 for the heating media is carried out on the left- and right-hand side of the plate body. The connections may be designed in such a way that the holes are at the highest point of the depression and can therefore allow any air to escape. The tube connectors 20 are attached to the front side and can be positioned in a flexible manner. The tube length can be specifically adapted to the reaction by using tube clamps 8. The tube clamps 8 also act as connections between the individual modules.

The microreactor can be provided, for example, for the reaction of a plurality of reactants in a plurality of stages, for example:

1. heating the reactants to a reaction temperature (first module)
2. reacting the reactants (second to fourth module)
3. diluting the solution and stopping the reaction (fifth module)

The individual reaction tube portions or microreactor parts represent separate modules.

Modules 1-4 are located in a functional plane since they operate at the same temperature level. The fifth module does not directly adjoin the fourth module if there is a different temperature level. It can be spatially separated by a spacer 3 and insulation plate 2.

Figure 1:
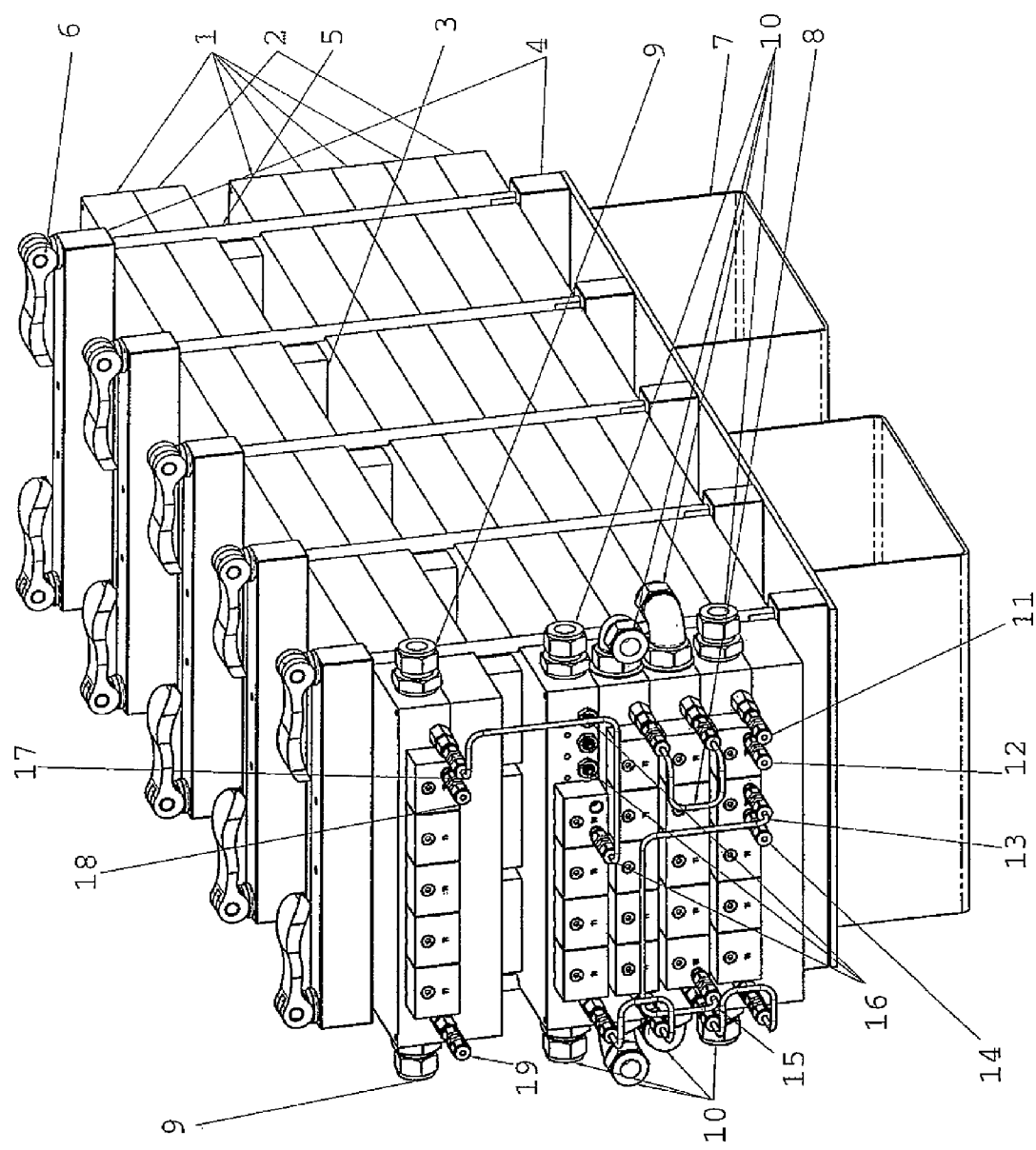
FIG. 1 is a three-dimensional view of an assembled microreactor formed of a plurality of microreactor parts which are linked by connection elements.

For example the specific embodiment of a reactor according to FIG. 1 shows the construction of individual microreactor parts 1 or modules which, for example, can be separated by cover modules 2 and an insulation body 3. The individual microreactor parts and plate insulation bodies are retained by fixing clips 4 which are fixed by connecting rods 5 and locking clamps 6. A foot in the form of a fork-lift attachment 7 is located beneath the reactor. The individual microreactor parts are connected by connection elements ('plate connectors') 8. Individual reaction tubes inside a plate body are connected, for example, by tube connection elements in the form of connecting blocks 20. The individual plates may comprise cooling medium inflows or outflows 9 or heating medium inflows or outflows 10. These cooling or heating media are guided through the plates in the depressions 22 as a heat transfer medium.

The microreactor can have a plurality of reaction media inlets and outlets, such as an inlet for a fluid A 11, inlet for a fluid B 12, an outlet for a mixture A/B 13, an inlet for a reaction fluid C 14, a supply for the reaction mixture A/B 15 in a further plate; alternatively an outlet for a mixture A/B/C (in this case: free connection end 16), a supply for the mixture A/B/C 17 in a further plate, a supply for the reaction medium D 18 and a product discharge 19.

Figure 2:
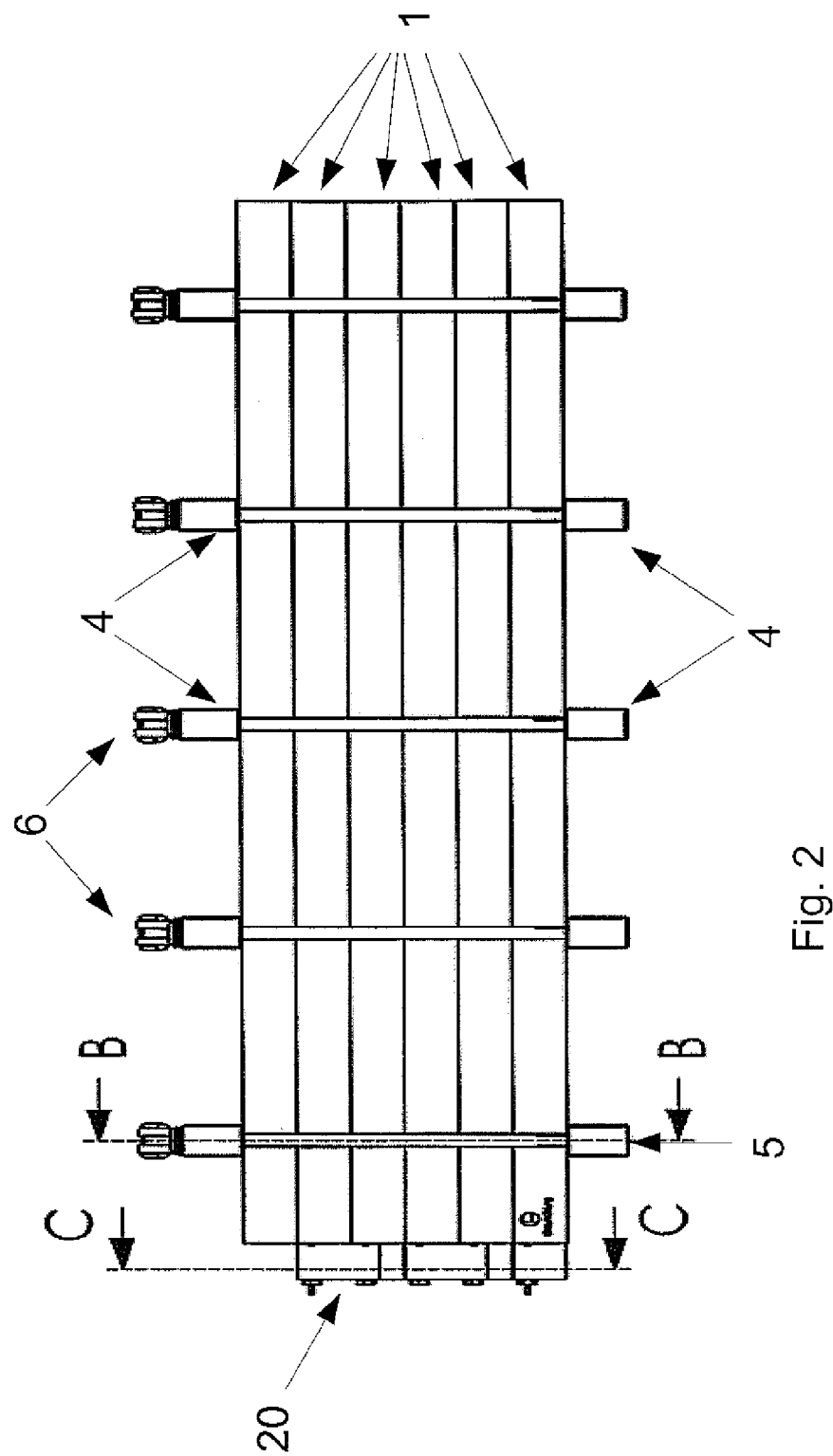
FIG. 2 shows a side view of the reactor.
Figure 3:
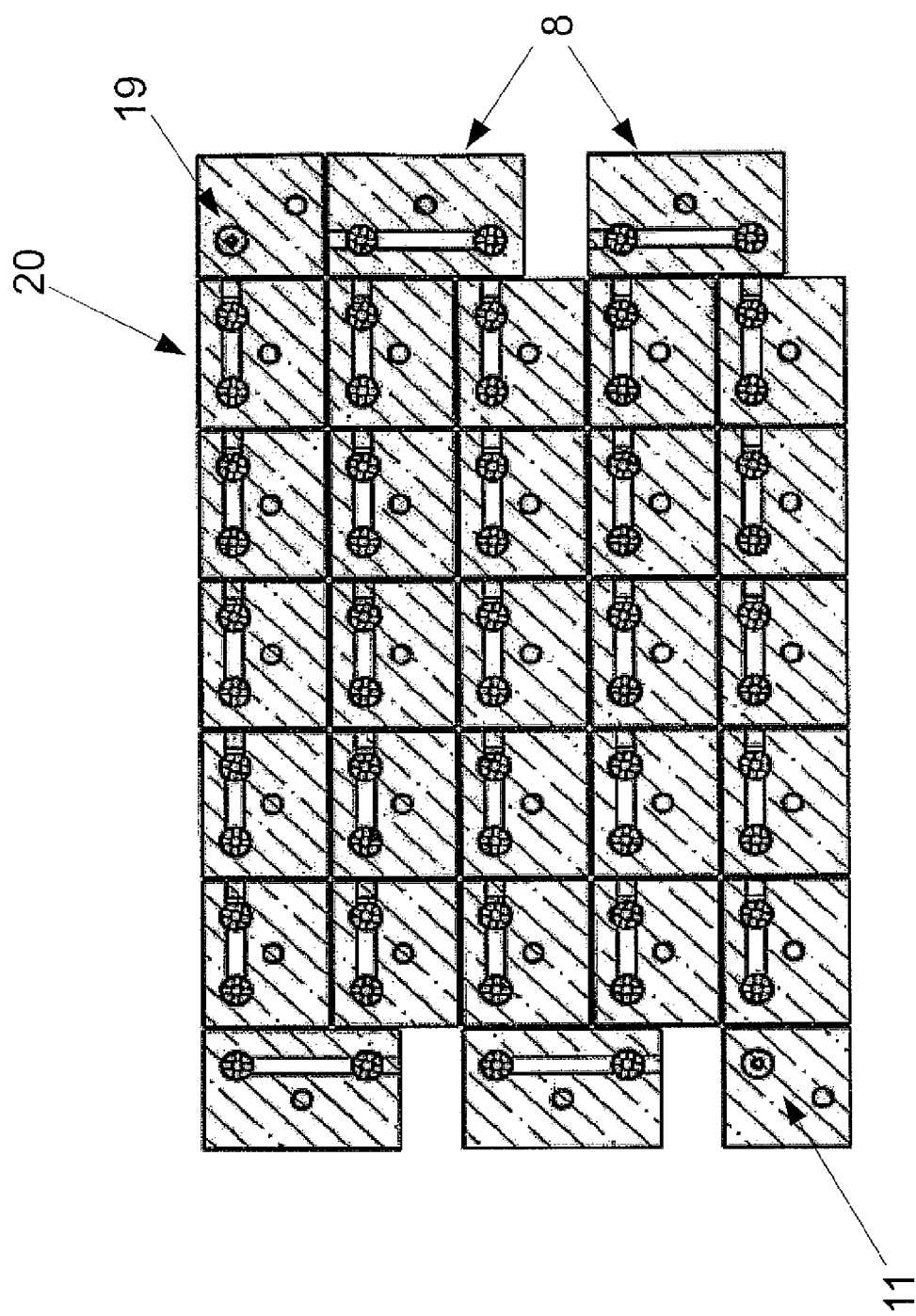
FIG. 3 shows a section through the front view of the reactor through various connection plug elements.
Figure 4:
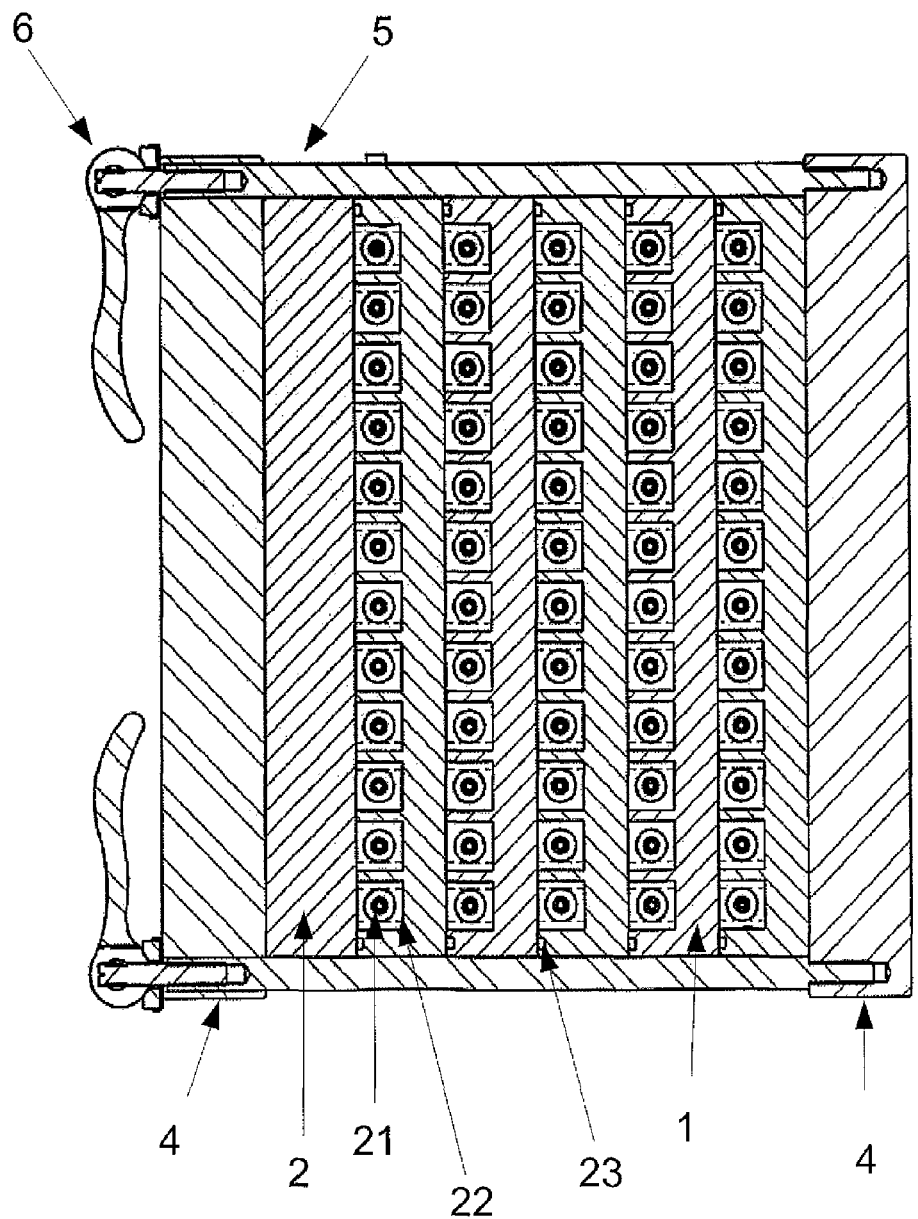
FIG. 4 shows a cross-section through the reactor in which the individual depressions are visible with the reaction tubes.

FIG. 2 shows a schematic side view of this reactor with six different plate bodies 1, illustrated in section C (FIG. 3) and B (FIG. 4).

FIG. 3 shows the section through different connection elements for connecting the tubes of the plates (tube connector) 20. The individual plates are connected by plate connectors 8.

In accordance with FIG. 4 a cross-section through a reactor formed of five different plates is shown and graphically shows how the reaction tubes 21 are embedded in the groove-shaped depressions 22. The individual plates can be sealed by seals 23.

Figure 5A:
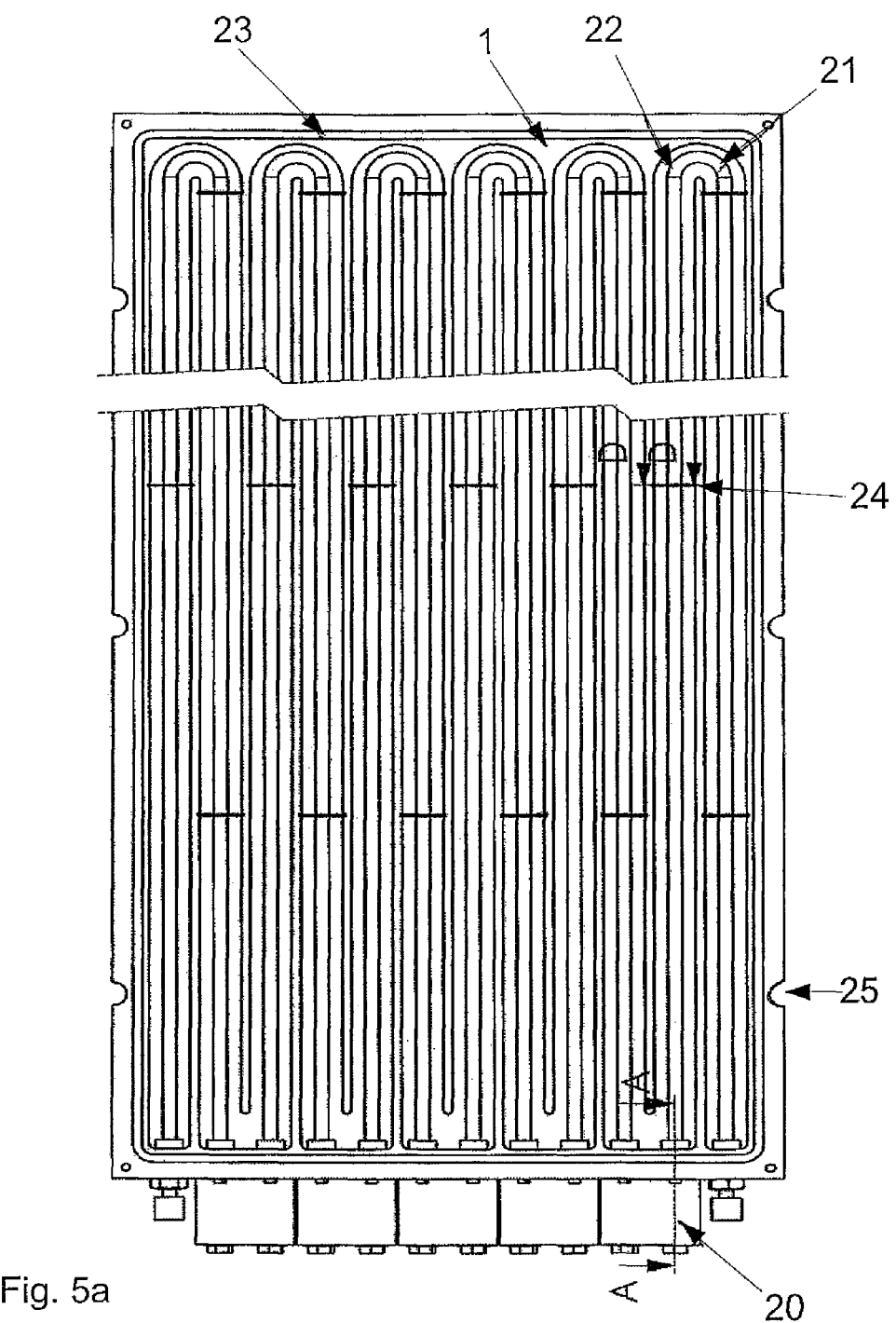
FIG. 5a shows a plan view of a microreactor part in which the depressions and reaction tubes are shown on a plate side.
Figure 5B:
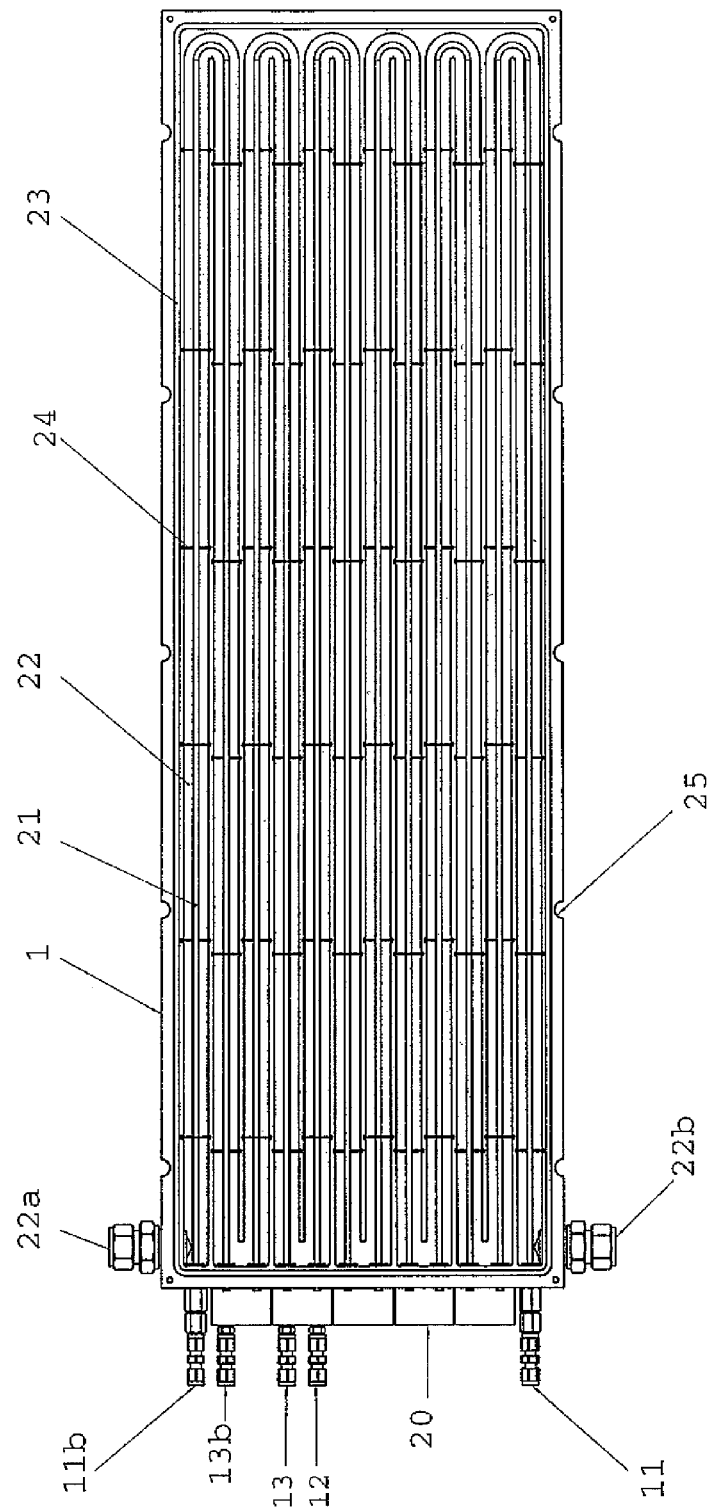
FIG. 5b shows an alternative plan view of a microreactor part.

As can be seen from FIG. 5a, the individual tubes can be fixed in the depressions by mounts 24. In order to fix the individual plates by the connecting rods 5, notches 25 are provided for the fixing of said connecting rods. FIG. 5b additionally shows a feed/discharge point 11 of the module, an inlet point 12, an discharge point 13, a mixing inlet 13b and a feed/outlet point 11b of the module. A thermal transfer medium supply 22b or thermal transfer medium discharge 22a is additionally illustrated.

Figure 6:
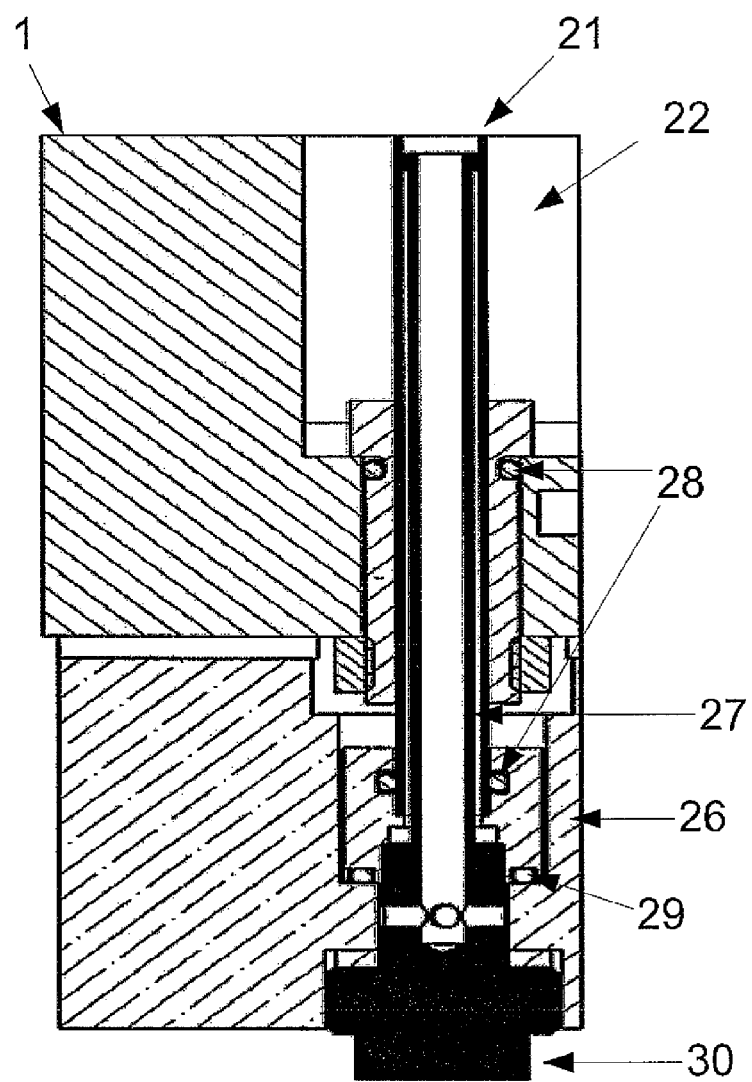
FIG. 6 shows a section through the connection of a reaction tube to a connection element in side view.

FIG. 6 shows a cross-section in side view through a connection element as it is attached to a plate body 1. In this instance a connection piece of the tube 21 was provided which could lead in depth to a further tube. The connection element is in this instance illustrated as a connecting block 26 which comprises a tube 27 which projects into the reaction tube of the plate 21. This tube 27 is sealed by a distribution element 30. Holes are provided in the distribution element 30 such that fluids can be supplied to the reactor from different directions (angles). The individual connection points are sealed by seals 28, 29 which can be designed as a tension seal 28 or pressure seal 29.

FIG. 7a shows a reaction tube 21 with cross-sectional reductions 31 and cross-sectional enlargements 32. These are preferably spaced by regular spacings a, for example 50 mm; FIG. 7b shows a reaction tube with round or spherical cross-sectional constrictions; and FIG. 7c shows a reaction tube with round cross-sectional enlargements and oblique cross-sectional constrictions at an inclined angle to the cross-section of the reaction tube.

FIG. 8 shows a cross-section through a cross-sectional constriction with an inner diameter i (for example 5 mm), an outer diameter a (for example 6 mm) and the cross-sectional constriction b (for example 1.51 mm). Of course, other measurements may also be provided for a cross-sectional constriction.

In FIG. 9 a connection element 20 is shown which connects tubes 21. In addition, an inlet or outlet point 34 is provided here. The tubes 21 and the inlet point 34 lead via mixing jets 33, which are designed as perforated disks, into a common channel and into an inlet point in a tube 35 arranged beside.

In accordance with FIG. 10 an inlet point 40 is shown where an injection lance 43 is shown above an inlet tube 41 above a connecting block element 37, which injection lance is closed by a centring piece 43b and leads into the tube 21 through different holes. Owing to the use of a plurality of holes, admitted fluid is guided continuously into the tube 21 at different points. The tube 21 leads directly into a further connection tube 42. The depressions 22 with the thermal transfer medium can be connected via a connection point 36 to adjacent tubes and the medium can be imported or exported. The tube 21 is fixed by a bushing 39 and a screw nut 38.

FIG. 11 shows three different plug elements a), b), c), one of which is designed as a simple plug connection a) between the tubes 21. In accordance with the embodiment b), a fluid inlet or outlet point is additionally located in the plug element 20. In accordance with FIG. 11 embodiment c) the plug element 20b is not designed as a connection element, but as an inlet or outlet for two adjacent tubes.

FIG. 12 shows a front and side view of the microreactor illustrated in FIG. 1.

FIG. 13 shows a front view of a specifically connected microreactor with illustrated positions 1-70. In this figure, in accordance with position 1 a fluid inlet of a fluid A is shown (11 in FIG. 1). In accordance with position 2 fluid B is supplied. The tube in position 3 heats the fluid A/B mixture. Position 4 shows the A/B offtake. Position 5 shows the reaction medium C inlet. Positions 6-12 show tubes for heating fluid C. The first module from beneath thus heats A/B and C in parallel. From position 12 to position 12 fluid C is guided into the second module. In position 14 the fluid A/B mixture is supplied to the second module. The tubes of positions 15-49 are used for the chemical reaction of A/B/C. In position 50 fluid D is supplied. The tubes in positions 51-59 are used for the reaction or to terminate a reaction, provided fluid D is a reaction terminator, and for temperature control. Position 60 shows the product run-off. In accordance with positions 61-68 a heating medium is supplied or removed and in accordance with positions 68 and 70 a cooling medium is supplied or removed.

FIG. 14 shows mixing lances in the form of four different injection needles which project through a mixing jet which is in the form of a perforated disk. Different mixing areas can be controlled by the staggered offset of the injection needles at different distances (b1, b2, b3).

Example 2

Operation

Feed

For a reaction of a microreactor connected in accordance with FIG. 13 the necessary chemicals are fed via pumps to the feed points or mixing points provided in the first module, where they are then introduced into the microreactor.

Feed Points:

fluid A position 1 fluid B position 2 (mixing point)

fluid C position 5 fluid D position 50 (mixing point)

The cooling/heating medium is fed by means of pumps and the medium enters on the longitudinal side through a ¾ inch Swagelok screw connection and exits on the opposite side (pos. 61-70). The modules 1-4 are supplied via a common feed line for the heating liquid since the modules are operated in the same temperature range. The liquid is fed in the fifth module via a separate line if the temperature level is different.

Mixing

The reactants are mixed in a counterflow mixer in which the reactants impact one another at considerably increased speeds. The increase in speed is achieved by small mixing plates. The mixed reactants are fed back into the reaction tube through a further small mixing plate.

Mixing Points are Located at the Following Positions:

mixing point 1 position 2 mixing point 2 position 14 mixing point 3 position 50

Reaction

The reaction is started at position 14, fluid C being added at this position to the fluid A/B mixture by a counterflow mixer. The necessary residence time can be adjusted by the number of tubes and modules.

Dilution

Owing to the addition of fluid D at position 50 the reaction is terminated by dilution and temperature change. The two flows are again mixed in a counterflow mixer.

Product Discharge

The product is discharged at position 60 at a temperature of approx. 40° C.

The apparatus should only be opened after the prior emptying of the reaction chambers and of the cooling circuit. In order to open the apparatus the locking clamps are released and the fixing rods are unscrewed therewith. The fixing rods and fixing clips can then be removed from the reactor. The reactor can now be opened by removing the individual modules.

For assembly the reactor modules are to be placed accurately on top of one another again and it should be checked that the modules are arranged in a flush and tight manner.

The fixing rods, fixing clips and locking clamps are then attached to the reactor and the fixing rods are biased by means of the locking clamp and the lock is then reversed.

Example 3

Operating Values

Specific flow rates and pressure ratios will be given by way of example in the following example with reference to the parameter values of Table 1 below. The microreactor designed in accordance with the invention was equipped with reaction tubes of diameter (2) and operated with the corresponding mass flow rates (1). The specific surface/volume ratio (3) was calculated on the basis of the reactor design and geometry.

TABLE 1

| | Parameters | | | |
|---|---|---|---|---|
| 1 | Flow rate [kg/h] | 0.1 | 1 | 8 |
| 2 | Tube inner diameter [mm] | 1 | 3 | 5.00 |
| 3 | Surface/volume [m²/m³] | 4000 | 1333.33 | 800.00 |
| | Empty tube speed [m/s] | | | |
| 4 | Fluid A | 0.40 | 0.44 | 1.27 |
| 5 | Fluid B | 0.03 | 0.04 | 0.11 |
| 6 | Mixture 1 | 0.43 | 0.48 | 1.38 |
| 7 | Fluid C | 0.29 | 0.32 | 0.93 |
| 8 | Mixture 2 | 0.72 | 0.80 | 2.31 |
| 9 | Fluid D | 0.35 | 0.39 | 1.13 |
| 10 | Product | 1.07 | 1.19 | 3.44 |
| | Speed ratio at nozzle [v2/v1] | | | |
| 11 | Fluid A | | 4.50 | |
| 12 | Fluid B | | 75.00 | |
| 13 | Mixture 1 | | 4.50 | |
| 14 | Fluid C | | 7.20 | |
| 15 | Mixture 2 | | 4.50 | |
| 16 | Fluid D | | 7.20 | |
| 17 | Product | | 4.50 | |
| | Volume flow/surface [l/hm²] | | | |
| 18 | Fluid A | 257 | 771 | 1286 |
| 19 | Mixture 1 | 280 | 841 | 1402 |
| 20 | Fluid C | 38 | 113 | 189 |
| 21 | Mixture 2 | 29 | 88 | 147 |
| 22 | Product | 140 | 419 | 699 |

TABLE 1-continued

| | Parameters | | | |
|---|---|---|---|---|
| | Reynolds number | | | |
| 23 | Fluid A | 1326 | 4421 | 21221 |
| 24 | Mixture 1 | 88 | 293 | 1407 |
| 25 | Fluid C | 265 | 884 | 4244 |
| 26 | Mixture 2 | 221 | 735 | 3529 |
| 27 | Product | 414 | 1381 | 6629 |
| | Total pressure loss [bar] | 33.0 | 4.1 | 13.73 |
| 28 | Pressure loss [%] | | | |
| 29 | Fluid A | 0 | 1 | 2 |
| 30 | Mixture 1 | 4 | 4 | 4 |
| 31 | Fluid C | 3 | 3 | 3 |
| 32 | Mixture 2 | 70 | 69 | 68 |
| 33 | Product | 23 | 23 | 23 |
| 34 | Nusselt number | | | |
| 35 | Fluid A | 1.5 | 22.8 | 0 |
| 36 | Mixture 1 | 25.0 | 33.6 | 44.84 |
| 37 | Fluid C | 5.9 | 6.2 | 37.44 |
| 38 | Mixture 2 | 16.5 | 17.3 | 50.17 |
| 39 | Product | 12.1 | 14.1 | 89.86 |

The fluid A was added to the microreactor at position 1 by means of pressure pumps and transported further to position 2 (mixing point) at an empty tube speed v1 (4) in the first reaction tubes.

Before mixing fluid A with fluid B, fluid A was fed via a mixing jet in order to adapt the flow speed.

The values of the speed ratio v2/v1 set by the mixing jet were as given under (11). In position 2 (mixing point) fluid b was supplied at an empty tube speed (5). In order to increase the first empty tube speed fluid B was also fed via a mixing jet. The speed ratio v2/v1 adjusted by the mixing jet assumed values as given under (12). The mixture 1 obtained was transported further at an empty tube speed (6) via connection pieces and was fed via a mixing jet in order to increase the fluid speed. The value of the speed ratio v2/v1 set by the mixing jet was as given under (13).

Fluid C was fed at position 5 of the reactor at an empty tube speed (7) for temperature control and was fed to mixing point 2 (position 14) for intensive mixing of the fluid mixture 1 (formed of fluid A and fluid B). In order to increase the first empty tube speed, fluid C was also fed via a mixing jet. The value of the speed ratio v2/v1 set by the mixing jet was as given under (14). The fluid mixture 2 obtained was transported further at an empty tube speed (8) and was fed via a mixing jet in order to increase the fluid speed. The value of the speed ratio v2/v1 set by the mixing jet was as given under (15). After a precisely set residence time with temperature control the mixture 2 obtained was removed from the reactor positions arranged before position 50 once the reaction had taken place and was supplied to mixing point 3 (position 50). Fluid D was supplied to mixing point 3 at position 50 of the reactor at an empty tube speed (9) for intensive mixing of the fluid mixture 2 (formed of fluid A and fluid B and fluid C). In order to increase the first empty tube speed (9) fluid D was also fed via a mixing jet. The value of the speed ratio v2/v1 set by the mixing jet was as given under (16). The product fluid obtained was transported further at an empty tube speed (10) and was fed via a mixing jet in order to increase the fluid speed. The value of the speed ratio v2/v1 set by the mixing jet was as given under (16). The product obtained was fed via a further mixing jet for speed adjustment (17), was removed from the last reactor position after a precisely set residence time with temperature control or heat removal, and was supplied for further processing.

The process parameters of volume flow/surface of the individual fluids, mixtures and products are illustrated, by way of example, by (18-22).

The Reynolds numbers resulting from the tube flows and illustrated by (23-25) lie in the range of 80 to 22,000.

The total pressure loss over the reactor area varies within a range of 4 to 33 bar as a function of the flow rate, the individual pressure losses of the fluids and mixtures which contribute to the total pressure loss possibly representing 1 to 70% of the total pressure loss.

The Nusselt numbers calculated by thermal transfer processes lie within the range of 1-200 depending on the fluid and mixture as well as the product.

Example 4

Production of Nitrotoluene

Pure toluene (boiling point 111° C., density=0.87 g/ml) is present in the microreactor (toluene storage container). Stabilised nitric acid (conc. nitric acid 65 wt. %, density=1.40 g/ml) and sulphuric acid (conc. sulphuric acid 95-98 wt. %, density=1.84 g/ml) are provided in separate buffer containers for the production of nitrating acid.

The reaction to form nitrotoluene itself is carried out in the microreactor according to the invention, the starting materials being fed into the microreactor from the provided storage containers by means of nitrogen overpressure via individual feed lines.

The reaction process for producing nitrotoluene is carried out in the microreactor, which is constructed in a modular manner as shown in FIG. 1 and basically comprises two zones: a reaction zone and a downstream residence time and cooling (temperature control) zone.

The temperature of the reaction zone of the microreactor is controlled in such a way that reactants guided through the reaction tubes are kept at approx. 5-10° C.

This preferably occurs by indirect heat removal controlled from the outer side of the tube by applying a cooling liquid (cooling oils or another heat transfer medium) to the reaction tubes.

In the downstream residence time and process cooling zone the reaction mixture can be temperature-controlled or cooled to approx. 2° C.-6° C.

Reaction Control:

The mixture of toluene and the production of the nitrating acid (nitric acid and sulphuric acid) are carried out in the cold temperature-controlled microreactor part.

The reaction portion of the microreactor for production of the nitrating acid is to be designed in terms of process technology in such a way that the temperature of the nitrating acid does not exceed 5° C. In a separate microreactor portion concentrated nitric acid is thus first mixed with concentrated sulphuric acid via a jet injection and mixing system, as shown in FIGS. 6, 10 and 9, and is immediately cooled in the tubes (FIG. 9, pos. 35) during the mixing process.

Owing to the further mixing of the reactants (nitrating acid and toluene) the nitrating reaction is started in the tubes with the cross-sectional reductions according to the invention as shown in FIGS. 7a, 7b and 8.

The nitrating reaction itself under the action of continuous mixing and energy supply and removal, the mixing of the reactants upstream of the reaction and the residence and termination of the reaction downstream of the reaction can also be carried out in microreactors with cross-sectional shapes as illustrated in FIGS. 15a-g and 16a-f.

The cooling or temperature control of the microreactor reaction zone is expediently designed in such a way that the reaction product does not exceed a temperature of 5-10° C. At excessively high reaction temperatures $NO_2$ development commences and must be prevented. The temperature of the reaction is controlled (heat removal/supply) as shown in FIG. 1 via the connections at pos. 9 and 10.

The toluene fed into the microreactor (FIG. 1, pos. 11) reacts with the nitrating acid added to the microreactor (nitric acid and sulphuric acid) in the capillary and reaction tubes, as shown in FIG. 5a, to form a nitrogen mixture 2-nitrotoluene (ortho-nitrotoluene), 3-nitrotoluene (meta-nitrotoluene), 4-nitrotoluene (para-nitrotoluene), 2,4 dinitrotoluene and water.

As is known from the literature, the actual nitrating agent ($NO_2^+$ is formed from nitric acid in the presence of sulphuric acid. The isomeric 2-nitrotoluene (Römpp Chemie Lexikon, Thieme publishers Stuttgart; $10^{th}$ edition; 1996) is also produced as a side reaction.

The aromatic nitrotoluenes are characterised by substituents, a methyl group and a nitro group on the benzene ring. The different positioning of the substituents produces a mixture formed of three structural isomers. The structural isomers are produced as a mixture during the nitration of toluene. The amount of 3-nitrotoluene is low, however, as a result of the digesting properties of the methyl group. It is known from the literature that during the electrophilic aromatic substitution of toluene with nitric acid the inductive effect of the methyl group is decisive for the management of the secondary substituent. Approx. 65% 2-nitrotoluene (ortho-nitrotoluene), approx. 30% 4-nitrotoluene (para-nitrotoluene) and 5% 3-nitrotoluene (meta-nitrotoluene) are produced as primary products (Beyer/Walter: Lehrbuch der Organischen Chemie, $19^{th}$ edition, S. Hirzel publishers, Stuttgart 1981).

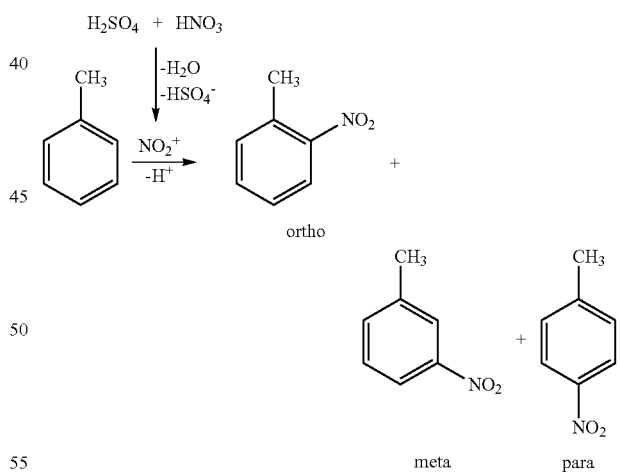

Once the reactants have been passed through the reaction path of the microreactor constructed in a modular manner (FIG. 1), the mixture is cooled in the following, coupled region (FIG. 13, pos. 69 to 70) of the microreactor via the connection (FIG. 1 pos. 9). Sometimes the reaction can be stopped by adding water (FIG. 1, pos. 18), thus possibly affecting the conversion rate. Once the reaction in the microreactor has ended or has been stopped selectively, the acidically reacting reaction mixture can be continuously removed (FIG. 1, pos. 19), isolated and purified.

The neutralisation may take place externally in batches in an associated apparatus, or else via a continuously operating static mixer which may also be part of the microreactor system.

Once the reaction mixture has been removed, it is mixed with cold water (+2° C.) and with cyclohexane (boiling point 80° C., density=0.78 g/ml) and is shaken. The organic phase is alternately washed with cold water and saturated sodium-hydrogen carbonate solution. After treatment with sodium hydrogen carbonate it is washed again with cold water and dried over sodium sulphate before it is subjected to a filtration step and the solvent is distilled off, for example on a rotary evaporator. The oily residue can be distilled further, such that the desired product can be removed in the boiling range between 100 and 130° C. The crystallized distillate can be crystallized as required and recrystallized in methyl alcohol to obtain 4-nitrotoluene (para-nitrotoluene) as yield. The solid distillation residue can be recrystallized from ethyl alcohol and the yield of 2,4 dinitrotoluene can be determined. The reaction yield of 2-nitrotoluene (orthonitrotoluene) cannot be given by incomplete product separation.

The invention claimed is:

1. A microreactor part comprising:
    a plate body including opposing sides, one of said sides having a depression
    a reaction tube in said depression, said reaction tube having connection ends located at an edge of the plate body, and being spaced from the plate body along an entire length of said reaction tube; and
    an induction coil in said depression between said reaction tube and said plate body.

2. The microreactor part according to claim 1, wherein the plate body is cuboid.

3. The microreactor part according to claim 1, wherein the plate body comprises at least two reaction tubes in the depression.

4. The microreactor part according to claim 3, further comprising at least one connection element connected to the connection ends and the edge of the plate body of the at least two reaction tubes, said at least one connection element having one of a fluid inlet and a fluid outlet.

5. The microreactor part according to claim 3, wherein the depression has a meander-shaped course and partition walls are provided between meander-shaped portions of the course, the partition walls being sealed together with the plate body, by a plate.

6. A reaction tube comprising: an inner diameter of up to 20 mm and a cross-sectional constriction as a mixing element, the cross-section being constricted on one side of the tube, preferably a round tube, by at least 15%, preferably at least 20%.

7. The reaction tube according to claim 6, characterised in that the cross-section of the tube is not enlarged compared to the constriction, preferably also 90° to the constriction, and the cross-section preferably forms a semi-circle at the constriction.

8. The reaction tube according to claim 6, which comprises a plurality of cross-sectional constrictions, the side of the cross-sectional constriction preferably changing in an alternating sequence, in particular the cross-sectional constrictions being spiralled or oppositely offset in the tube cross-section, and/or the cross-sectional constrictions preferably being straight, prismatic, cylindrical or spherical.

9. A microreactor comprising:
    at least two microreactor parts, each having a plate body which has a depression on one plate side;
    a reaction tube in said depression, said reaction tube being spaced from said plate body and including connection ends located at an edge of said plate body, wherein ends of said reaction tubes of the at least two microreactor parts are connected via a connection element; and
    an induction coil in said depression between said reaction tube and said plate body.

10. The microreactor according to claim 9, wherein said connection element comprises at least one of an inlet and an outlet for accommodating reaction fluid into or from the reaction tube, and an inlet or outlet for fluid into or from a channel of the depression.

11. A kit for producing a microreactor comprising;
    at least two microreactor parts having a plate body which each have a depression on one plate side of said plate body;
    a reaction tube in said depression, said reaction tube including connection ends located at an edge of the plate body;
    a connection element for connecting the reaction tubes of the microreactor parts; and
    an induction coil in said depression between said reaction tube and said plate body.

12. The microreactor part according to claim 1, wherein at least one of the connection ends comprises a fluid mixer, the fluid mixer being one of a flow breaker, a flow accelerator, a mixing jet or a projecting injection needle.

13. The microreactor part according to claim 4, wherein one of the fluid inlet or the fluid outlet of the at least one connection element comprises a fluid mixer, the fluid mixer being one of a flow breaker, a flow accelerator, a mixing jet or a projecting injection needle.

* * * * *